United States Patent [19]

Tseng

[11] Patent Number: 4,876,607

[45] Date of Patent: Oct. 24, 1989

[54] COMPLEX CHARACTER GENERATOR UTILIZING BYTE SCANNING

[75] Inventor: Samuel C. Tseng, Pleasantville, N.Y.

[73] Assignee: International Business Machines Corporation, Armonk, N.Y.

[21] Appl. No.: 364,061

[22] Filed: Mar. 31, 1982

[51] Int. Cl.[4] .............................................. H04N 1/415

[52] U.S. Cl. ................................. 358/261.2; 340/751; 358/470; 382/56

[58] Field of Search ............ 358/261, 260, 263, 261.2; 340/703, 794, 751; 382/56; 364/523

[56] References Cited

U.S. PATENT DOCUMENTS

| | | | |
|---|---|---|---|
| 3,521,241 | 7/1970 | Rumble | 358/261 |
| 3,830,965 | 8/1974 | Beaudette | 358/261 |
| 3,936,664 | 2/1976 | Sato | 364/523 |
| 3,950,609 | 4/1976 | Tanaka | 358/260 |
| 3,980,809 | 9/1976 | Cook | 358/260 |
| 3,992,572 | 11/1976 | Nakagome | 358/260 |
| 3,999,167 | 12/1976 | Ito | 340/751 |
| 4,068,224 | 1/1978 | Bechtle | 358/260 |
| 4,125,873 | 11/1978 | Chesarek | 358/133 |
| 4,173,753 | 11/1979 | Chou | 382/56 |
| 4,181,973 | 1/1980 | Tseng | 340/751 |
| 4,233,601 | 11/1980 | Hankins | 340/703 |
| 4,286,329 | 8/1981 | Goertzel | 340/751 |
| 4,426,731 | 1/1984 | Edlund | 358/261 |

*Primary Examiner*—Howard W. Britton
*Attorney, Agent, or Firm*—Jack M. Arnold

[57] ABSTRACT

A character compaction and generation method and apparatus which is particularly adapted to the compaction and generation of complex characters such as Kanji characters. Each character in a complex character set is defined by an I row and J column dot matrix, wherein each row is comprised of J bytes. Each successive row of a given character is scanned from the first through the Jth byte to determine if the current byte being scanned has the same numerical value as the immediately preceding or directly above byte in the scanning sequence. The number of successively read out sequence of bytes that have the same numerical value as the immediately preceding or directly above byte are coded as single symbols words Pn and Am, respectively, where n and m are integers which are indicative of the number of successive bytes scanned in sequence which are equal in numerical value to each immediately preceding or directly above byte. If a current byte being scanned is not of the same numerical value as the previous byte or the above byte, it is coded as a single symbol Sx, where x is an integer which is indicative of its numerical value. Each of the successively generated symbols Pn, Am and Sx for a given complex character are stored as a compacted complex representation thereof.

17 Claims, 22 Drawing Sheets

ENCODE TABLE

| A | CODE | SYMBOL | | PROB # | BITS |
|---|---|---|---|---|---|
| 1 | 011 | A1 | 401 | 35745 | 3 |
| 2 | 1011 | S0 | 256 | 15491 | 4 |
| 3 | 1100 | A2 | 402 | 15317 | 4 |
| 4 | 00001 | S255 | 255 | 12504 | 5 |
| 5 | 00011 | S24 | 24 | 11636 | 5 |
| 6 | 01001 | S12 | 12 | 9154 | 5 |
| 7 | 10001 | P1 | 301 | 8377 | 5 |
| 8 | 10010 | | 6 | 8374 | 5 |
| 9 | 10100 | | 48 | 8145 | 5 |
| 10 | 000001 | | 96 | 6318 | 6 |
| 11 | 000100 | | 128 | 6178 | 6 |
| 12 | 001000 | | 192 | 5845 | 6 |
| 13 | 001100 | | 3 | 5203 | 6 |
| 14 | 010001 | | 403 | 4605 | 6 |
| 15 | 010101 | | 1 | 4490 | 6 |
| 16 | 010111 | | 127 | 4397 | 6 |
| 17 | 100001 | | 254 | 4180 | 6 |
| 18 | 101010 | | 404 | 3988 | 6 |
| 19 | 101011 | | 28 | 3985 | 6 |
| 20 | 111000 | | 252 | 3614 | 6 |
| 21 | 111111 | | 7 | 3265 | 6 |
| 22 | 0000000 | | 63 | 3261 | 7 |
| 23 | 0001011 | | 248 | 2903 | 7 |
| 24 | 0010100 | | 14 | 2809 | 7 |
| 25 | 0010101 | | 224 | 2745 | 7 |
| 26 | 0011010 | | 31 | 2563 | 7 |
| 27 | 0011100 | | 408 | 2513 | 7 |
| 28 | 0011110 | | 15 | 2419 | 7 |
| 29 | 0100000 | | 56 | 2364 | 7 |
| 30 | 0101001 | | 2 | 2263 | 7 |
| 31 | 0101101 | | 25 | 2193 | 7 |
| 32 | 1000001 | | 240 | 2086 | 7 |
| 33 | 1001100 | | 134 | 2074 | 7 |
| 34 | 1001110 | | 32 | 2013 | 7 |
| 35 | 1101000 | | 140 | 2001 | 7 |
| 36 | 1101001 | | 198 | 1941 | 7 |

FIG. 2

COLUMNS

ROWS

| | J = 1 | 2 | 3 | 4 |
|---|---|---|---|---|
| I = 1 | 1 | 2 | 3 | 4 |
| 2 | 5 | 6 | 7 | 8 |
| 3 | | | | |
| 4 | A1 | | A2 | P1 |
| , | C1 | P2 | C2 | |
| , | | | | |
| , | | | | |
| , | | | | |
| , | 121 | 122 | 123 | 124 |
| 32 | 125 | 126 | 127 | 128 |

FIG. 4

16

| Pn TABLE | | | |
|---|---|---|---|
| P1 | P2 | P3 | P4 |
| 301 | 302 | 303 | 304 |

18

| Am TABLE | | | |
|---|---|---|---|
| A1 | A2 | A3 | A4 |
| 401 | 402 | 403 | 404 |
| | | | |
| A5 | A6 | A7 | A8 |
| 405 | 406 | 407 | 408 |

20

| Sx TABLE | | | |
|---|---|---|---|
| S1 | S2 | S3 | S4 |
| 1 | 2 | 3 | 4 |
| | | | |
| S5 | ------- | S255 | S256 |
| 5 | ------- | 255 | 0 |

| I | J 1 | 2 | 3 | 4 |
|---|---|---|---|---|
| 1 | 0 | 0 | 0 | 0 |
| 2 | 0 | 0 | 0 | 16 |
| 3 | 0 | 0 | 0 | 56 |
| 4 | 63 | 255 | 255 | 252 |
| 5 | 0 | 6 | 0 | 0 |
| 6 | 0 | 6 | 0 | 0 |
| 7 | 0 | 6 | 0 | 0 |
| 8 | 0 | 6 | 0 | 0 |
| 9 | 0 | 6 | 0 | 0 |
| 10 | 0 | 6 | 0 | 0 |
| 11 | 0 | 12 | 0 | 0 |
| 12 | 0 | 12 | 0 | 0 |
| 13 | 0 | 12 | 1 | 0 |
| 14 | 0 | 12 | 3 | 128 |
| 15 | 3 | 255 | 255 | 192 |
| 16 | 0 | 12 | 1 | 192 |
| 17 | 0 | 12 | 1 | 128 |
| 18 | 0 | 24 | 1 | 128 |
| 19 | 0 | 24 | 1 | 128 |
| 20 | 0 | 24 | 1 | 128 |
| 21 | 0 | 24 | 1 | 128 |
| 22 | 0 | 24 | 1 | 128 |
| 23 | 0 | 24 | 1 | 128 |
| 24 | 0 | 24 | 1 | 128 |
| 25 | 0 | 48 | 1 | 128 |
| 26 | 0 | 48 | 1 | 128 |
| 27 | 0 | 48 | 1 | 136 |
| 28 | 0 | 48 | 1 | 156 |
| 29 | 0 | 48 | 1 | 190 |
| 30 | 255 | 255 | 255 | 255 |
| 31 | 0 | 0 | 0 | 0 |
| 32 | 0 | 0 | 0 | 0 |

FIG.6

COMRESSED COMLEX CHARACTER

| | | | |
|---|---|---|---|
| (1) A7 | (14) A8 | (27) S12 | (40) S136 |
| (2) S16 | (15) A4 | (28) S1 | (41) A3 |
| (3) A3 | (16) S12 | (29) A4 | (42) S156 |
| (4) S56 | (17) A8 | (30) S128 | (43) A3 |
| (5) S63 | (18) S1 | (31) A1 | (44) S190 |
| (6) S255 | (19) A3 | (32) S24 | (45) S255 |
| (7) P1 | (20) S3 | (33) A8 | (46) P3 |
| (8) S252 | (21) S128 | (34) A8 | (47) S256 |
| (9) S256 | (22) S3 | (35) A8 | (48) P4 |
| (10) 56 | (23) S255 | (36) A3 | (49) A3 |
| (11) S256 | (24) P1 | (37) S48 | |
| (12) P2 | (25) S192 | (38) A8 | |
| (13) A8 | (26) S256 | (39) A1 | |

FIG. 7

FIG. 8

ENCODE TABLE

| A | CODE | SYMBOL | | PROB # | BITS |
|---|---|---|---|---|---|
| 1 | 011 | A1 | 401 | 35745 | 3 |
| 2 | 1011 | S0 | 256 | 15491 | 4 |
| 3 | 1100 | A2 | 402 | 15317 | 4 |
| 4 | 00001 | S255 | 255 | 12504 | 5 |
| 5 | 00011 | S24 | 24 | 11636 | 5 |
| 6 | 01001 | S12 | 12 | 9154 | 5 |
| 7 | 10001 | P1 | 301 | 8377 | 5 |
| 8 | 10010 | | 6 | 8374 | 5 |
| 9 | 10100 | | 48 | 8145 | 5 |
| 10 | 000001 | | 96 | 6318 | 6 |
| 11 | 000100 | | 128 | 6178 | 6 |
| 12 | 001000 | | 192 | 5845 | 6 |
| 13 | 001100 | | 3 | 5203 | 6 |
| 14 | 010001 | | 403 | 4605 | 6 |
| 15 | 010101 | | 1 | 4490 | 6 |
| 16 | 010111 | | 127 | 4397 | 6 |
| 17 | 100001 | | 254 | 4180 | 6 |
| 18 | 101010 | | 404 | 3988 | 6 |
| 19 | 101011 | | 28 | 3985 | 6 |
| 20 | 111000 | | 252 | 3614 | 6 |
| 21 | 111111 | | 7 | 3265 | 6 |
| 22 | 0000000 | | 63 | 3261 | 7 |
| 23 | 0001011 | | 248 | 2903 | 7 |
| 24 | 0010100 | | 14 | 2809 | 7 |
| 25 | 0010101 | | 224 | 2745 | 7 |
| 26 | 0011010 | | 31 | 2563 | 7 |
| 27 | 0011100 | | 408 | 2513 | 7 |
| 28 | 0011110 | | 15 | 2419 | 7 |
| 29 | 0100000 | | 56 | 2364 | 7 |
| 30 | 0101001 | | 2 | 2263 | 7 |
| 31 | 0101101 | | 25 | 2193 | 7 |
| 32 | 1000001 | | 240 | 2086 | 7 |
| 33 | 1001100 | | 134 | 2074 | 7 |
| 34 | 1001110 | | 32 | 2013 | 7 |
| 35 | 1101000 | | 140 | 2001 | 7 |
| 36 | 1101001 | | 198 | 1941 | 7 |

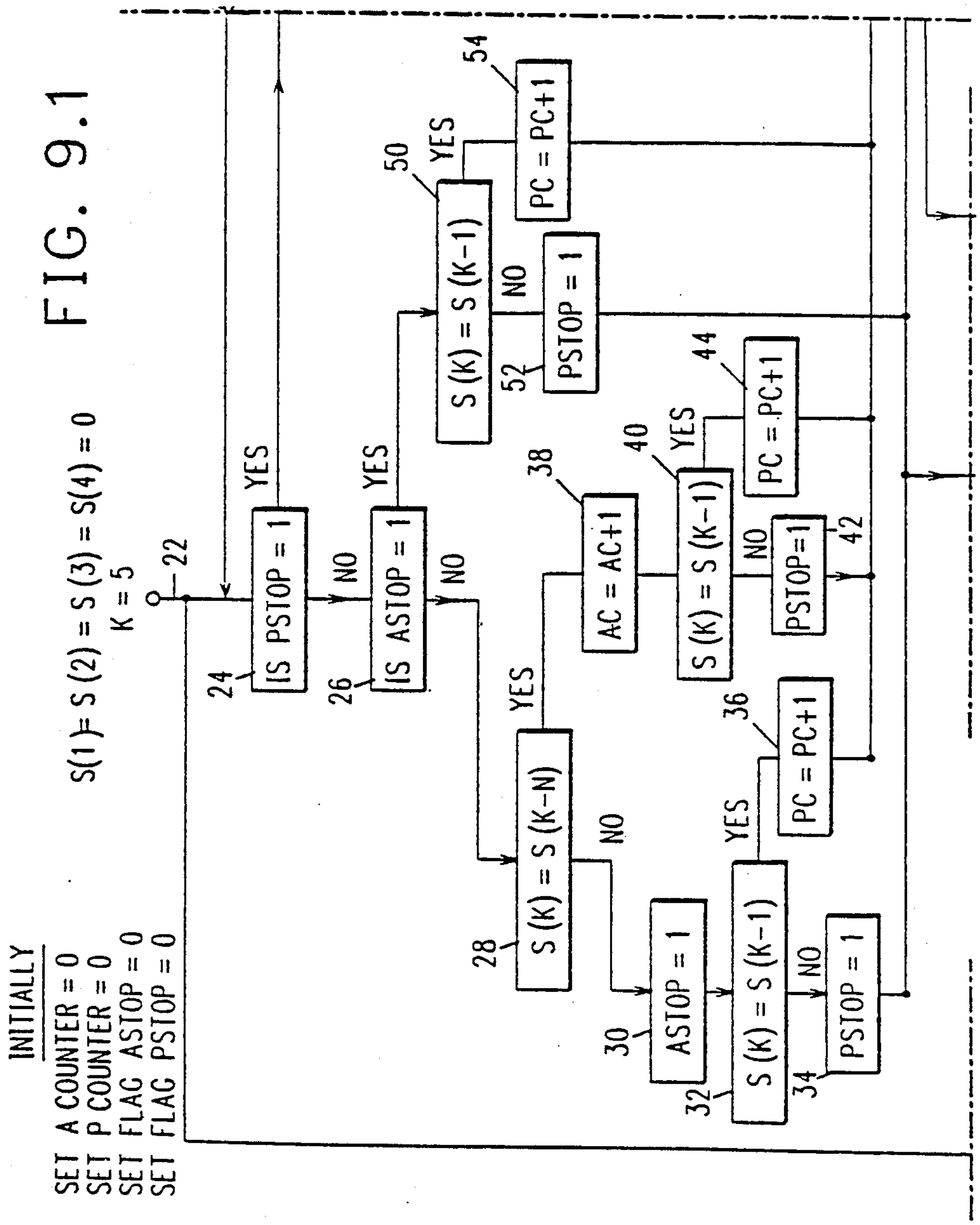
FIG. 9.1

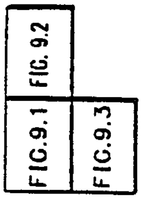
FIG. 9
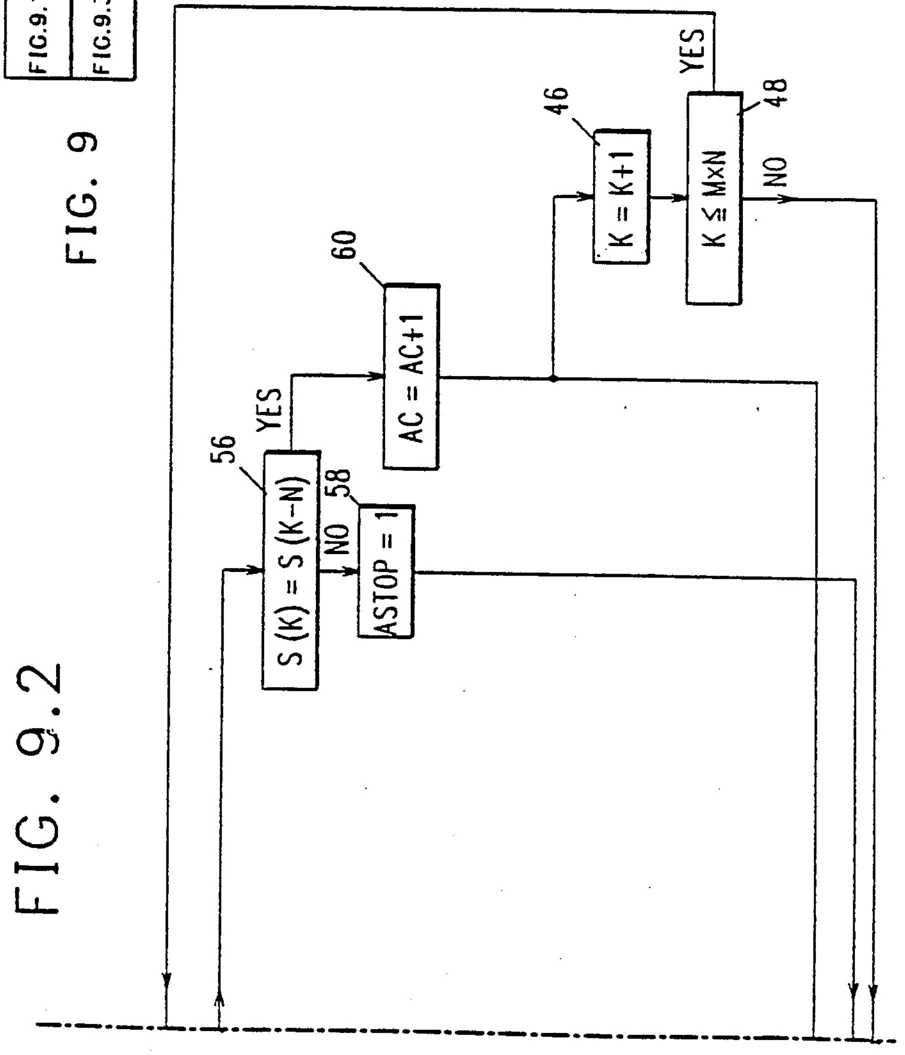
FIG. 9.2

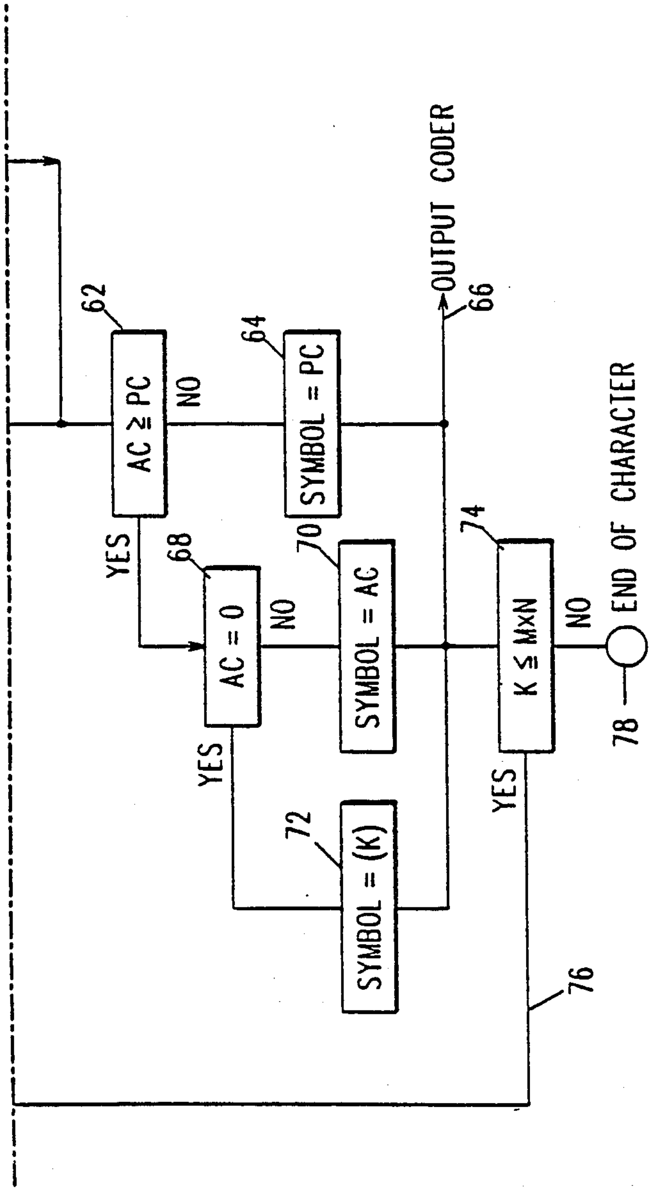
FIG. 9.3

FIG. 10.1
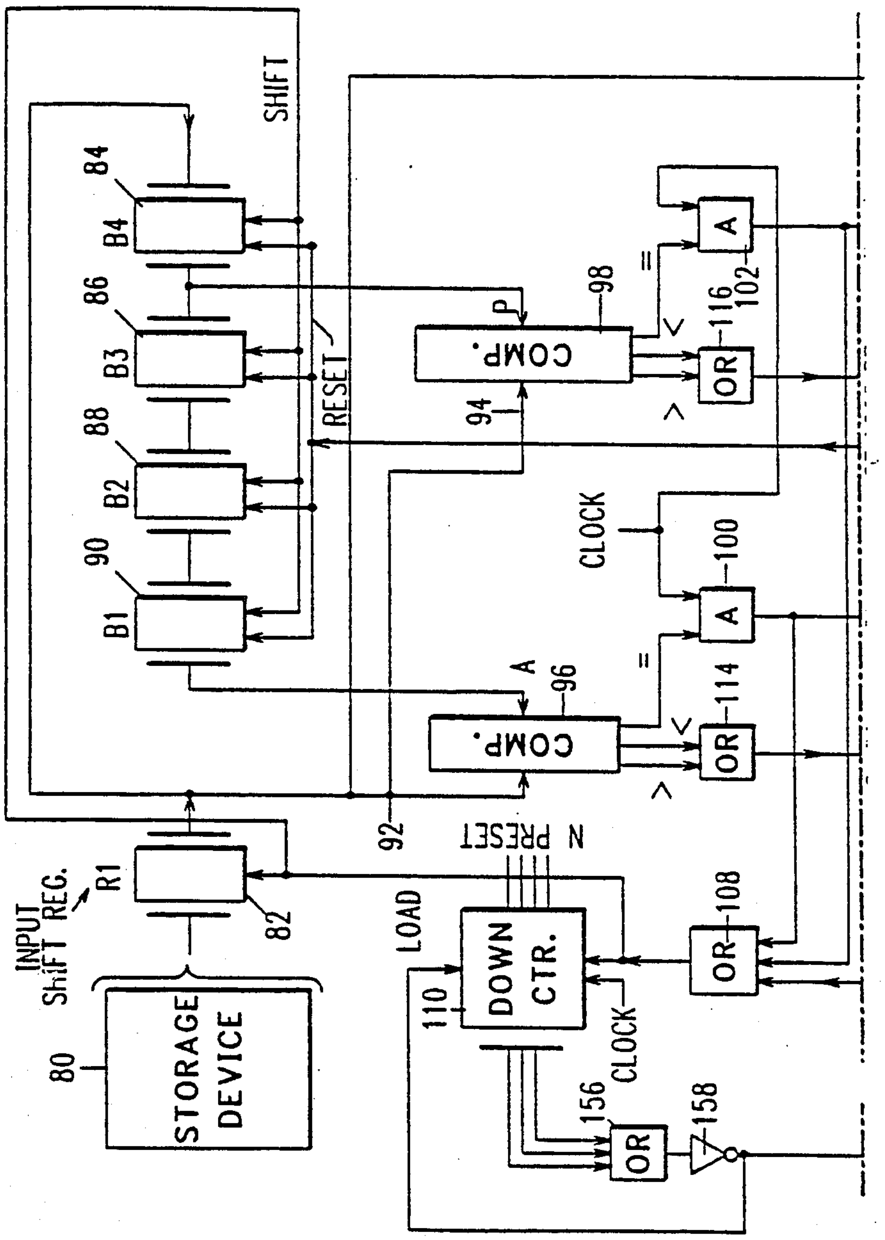

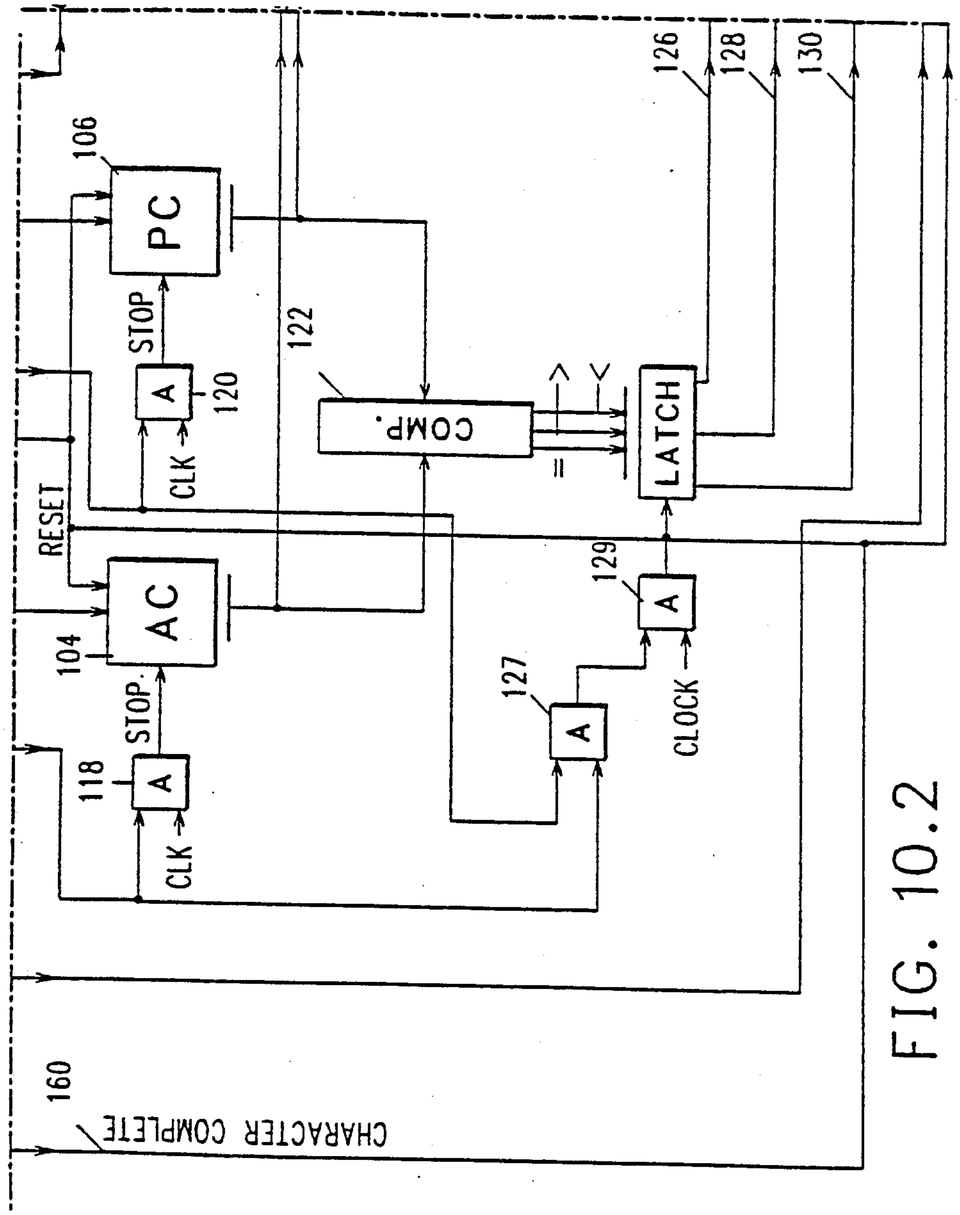
FIG. 10.2

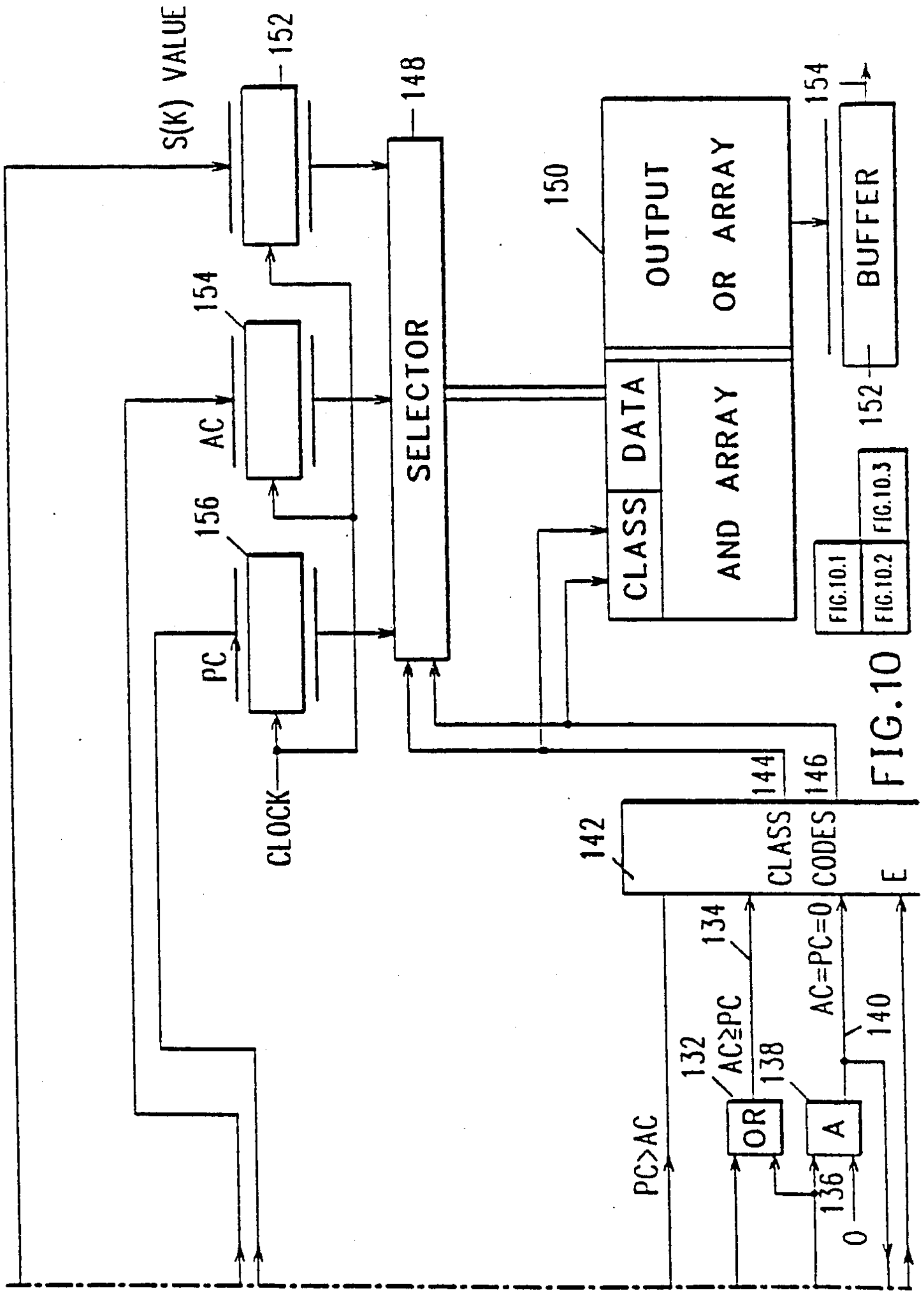
FIG. 10.3

| | ADDRESS | | $T_0$ (A) | $T_1$ (A) |
|---|---|---|---|---|
| I = | → 1 | HTABLE = | 2 | 162 → 3 |
| I = | 2 | HTABLE = | 4 | 5 |
| I = | → 3 | HTABLE = | 164 → 6 | 7 |
| I = | 4 | HTABLE = | 8 | 9 |
| I = | 5 | HTABLE = | 10 | ¯401 |
| I = | → 6 | HTABLE = | 166 → 11 | 12 |
| I = | 7 | HTABLE = | 13 | 14 |
| I = | 8 | HTABLE = | 15 | 16 |
| I = | 9 | HTABLE = | 17 | 18 |
| I = | 10 | HTABLE = | 19 | 20 |
| I = | → 11 | HTABLE = | 168 → 21 | 22 |
| I = | 12 | HTABLE = | 23 | ¯256 |
| I = | 13 | HTABLE = | ¯402 | 24 |
| I = | 14 | HTABLE = | 25 | 26 |
| I = | 15 | HTABLE = | 27 | ¯255 |
| I = | 16 | HTABLE = | 28 | ¯24 |
| I = | 17 | HTABLE = | 29 | 30 |
| I = | 18 | HTABLE = | 31 | 32 |
| I = | 19 | HTABLE = | 33 | ¯12 |
| I = | 20 | HTABLE = | 34 | 35 |
| I = | → 21 | HTABLE = | 36 | 170 → ¯301 |
| I = | 22 | HTABLE = | ¯6 | 37 |
| I = | 23 | HTABLE = | ¯48 | 38 |
| I = | 24 | HTABLE = | 39 | 40 |
| I = | 25 | HTABLE = | 41 | 42 |
| I = | 26 | HTABLE = | 43 | 44 |
| I = | 27 | HTABLE = | 45 | ¯96 |
| I = | 28 | HTABLE = | ¯128 | 46 |
| I = | 29 | HTABLE = | ¯192 | 47 |
| I = | 30 | HTABLE = | 48 | 49 |

FIG. 11

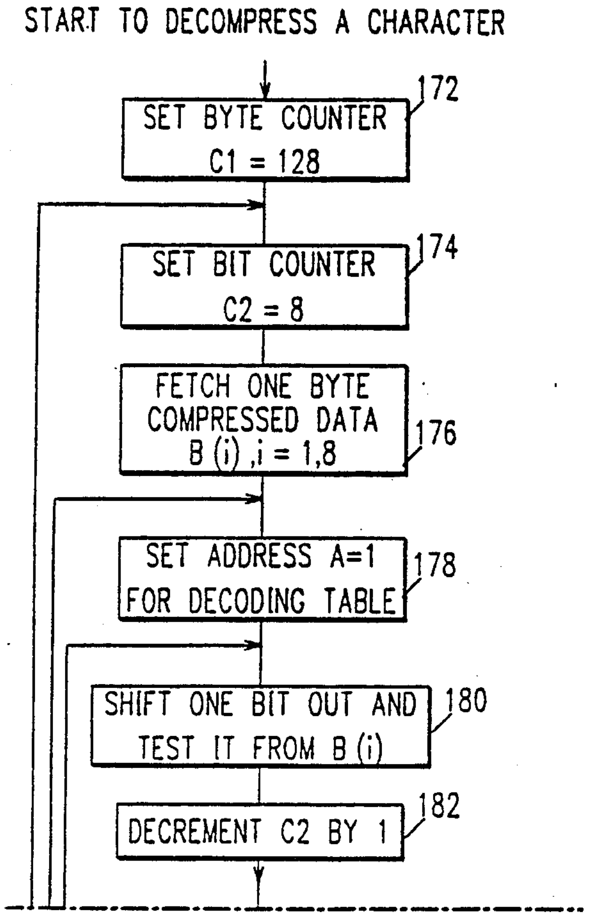
FIG.12.1

FIG. 12.2
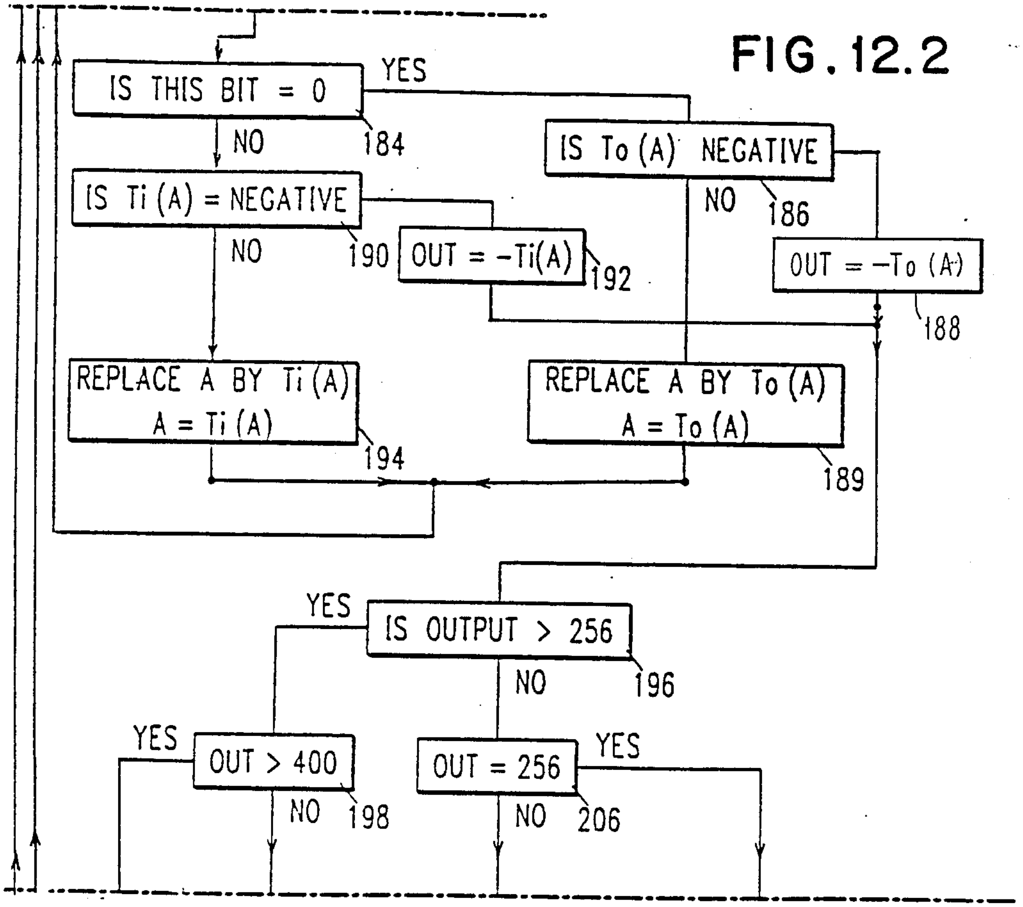

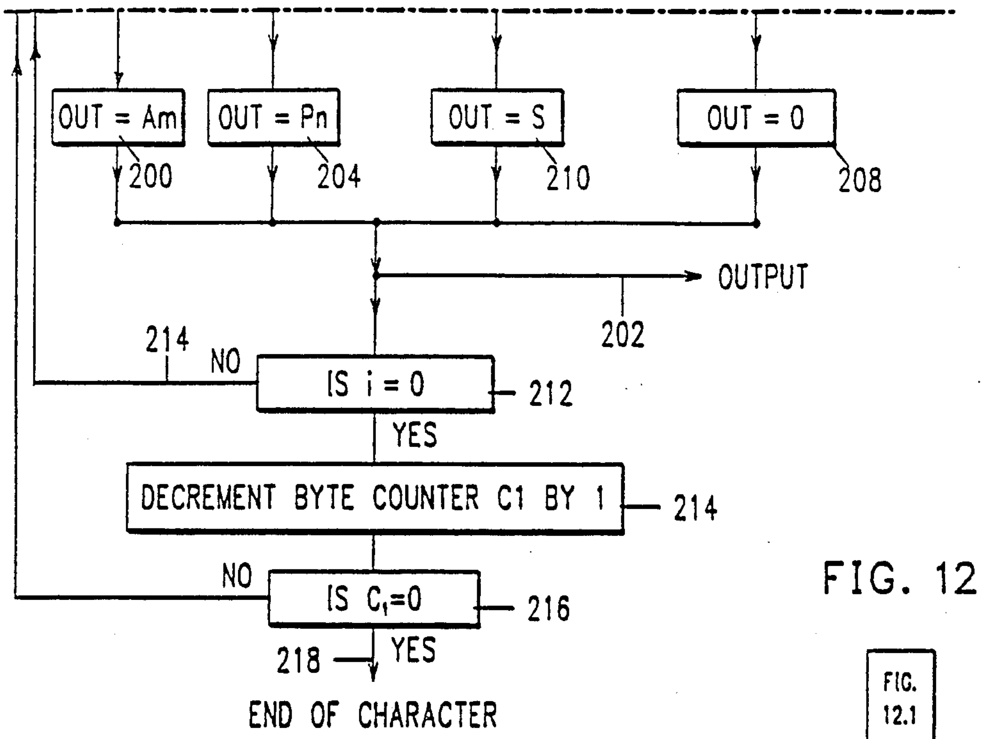
FIG. 12.3
FIG. 12

FIG. 13
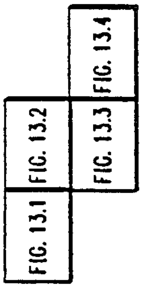
FIG. 13.4
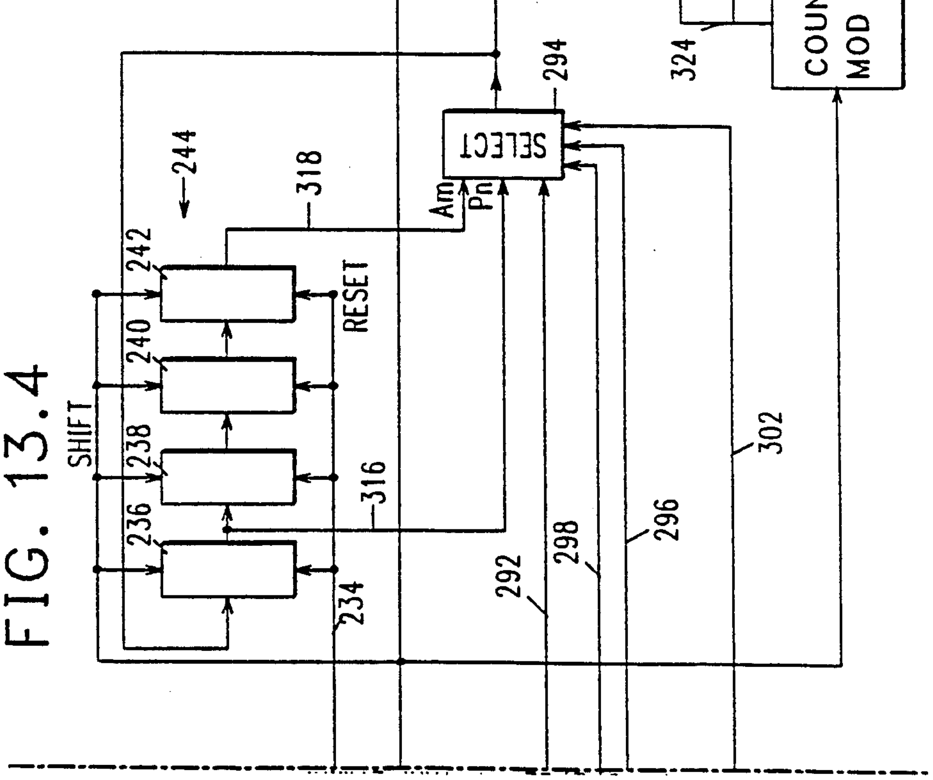

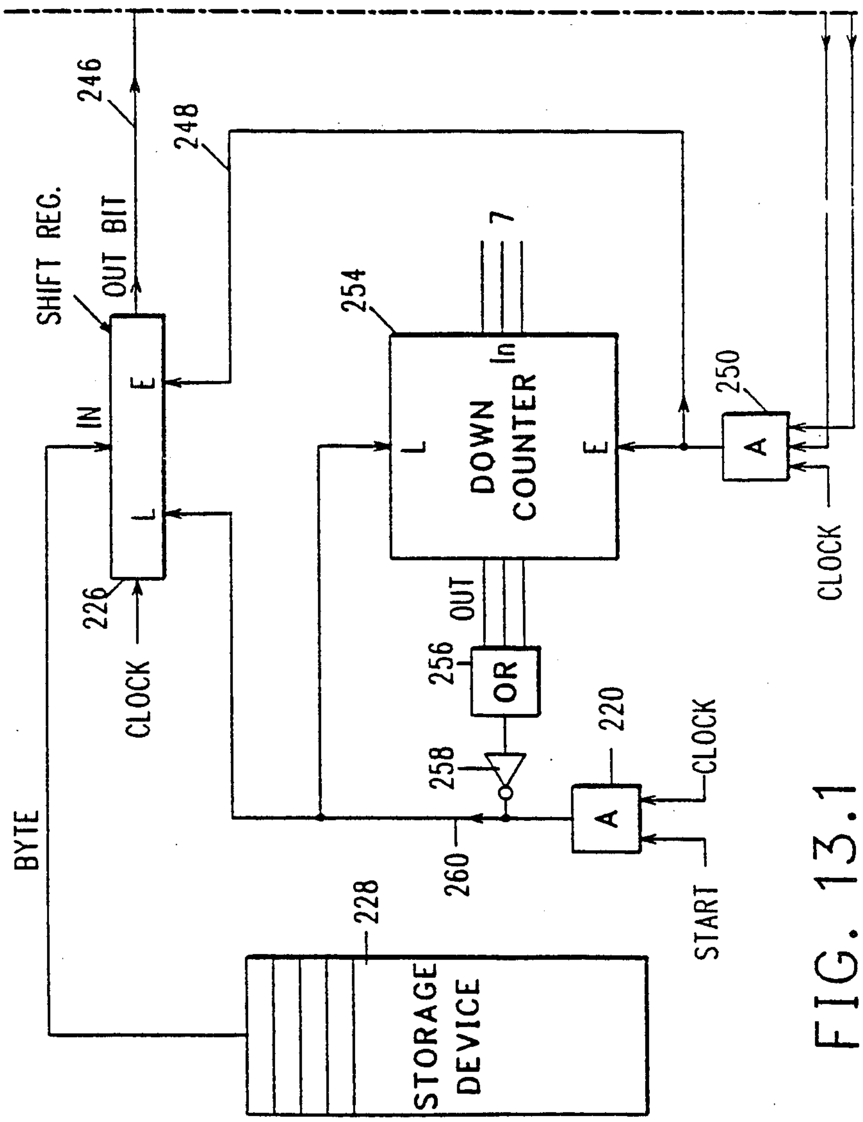
FIG. 13.1

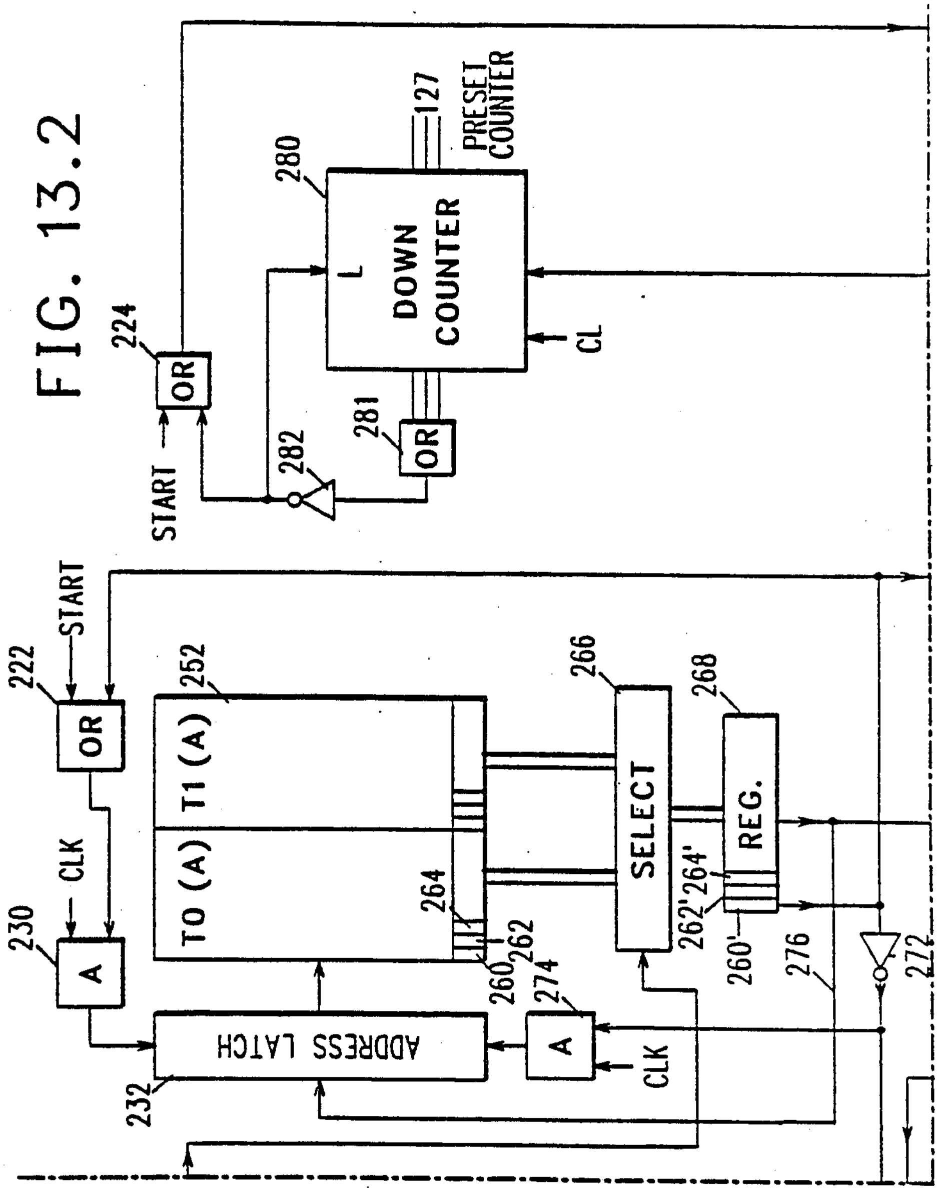
FIG. 13.2

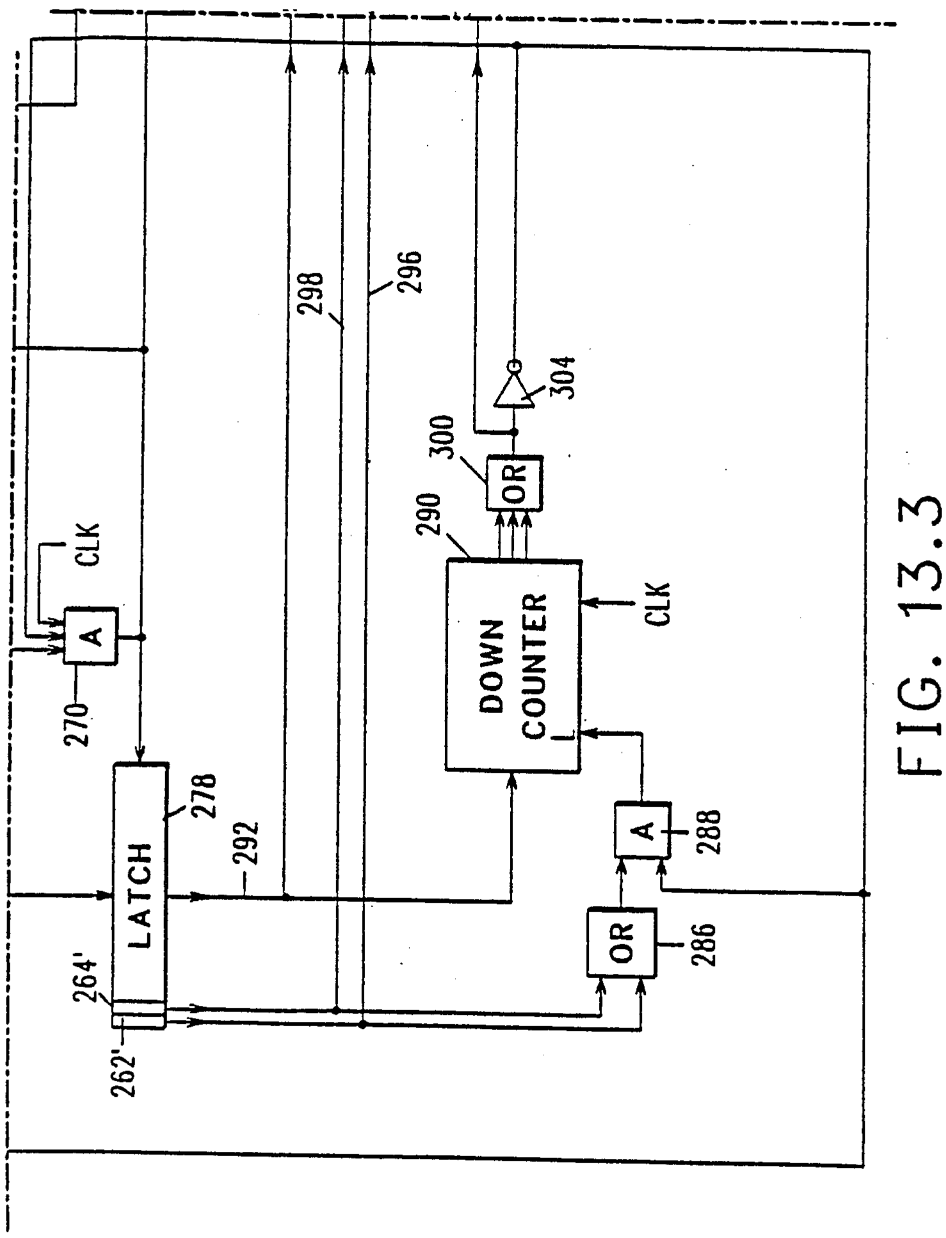
FIG. 13.3

COMPLEX CHARACTER GENERATOR UTILIZING BYTE SCANNING

TECHNICAL FIELD

The invention is in the field of character generators, and in particular complex character generators, wherein the complex characters are characters such as Kanji characters, Hebrew characters, Arabic characters or the like. The principles of the present invention are also applicable to the generation of any complex pattern pictorial representation or the like. The complex character generator utilizes minimal memory capacity, since the complex characters are compacted, and then decompacted prior to the generation of a given complex character utilizing a two-dimensional byte run-length code. Heretofore, certain known complex character generators have generated characters by utilizing a memory where the picture elements of each character of the character set are stored in a memory. That is, a memory cell is allocated for the storage of each element in a given character. It is seen therefore, that with a corresponding memory cell allocated for each element in the character set, it can be appreciated that the memory capacity is quickly used up in the generation of complex characters. For example, in a 32×32 element matrix there are 1,024 elements and therefore, it is necessary to utilize 1,024 bits, that is 128 bytes, to define a given character. Assume therefore, that there is a requirement of on the order of 1,000 bits to generate a given character. If there are 6,000,000 storage locations are required to store the information to generate the 6,000 characters. Accordingly, the size and the cost of such a character generation apparatus is prohibitive.

Various methods of complex character compaction such as Kanji character compaction have been reported. They are classified into two general categories. The first is to treat a Kanji ideogram as a general two dimensional picture and to perform the data compaction without the knowledge of the Kanji character itself. Another approach is to make use of the structural characteristics of a Kanji character in its compaction. Since the latter proves to yield a higher compaction efficiency, it will be discussed in more detail.

A commonly known method belonging to the latter type of compaction is "composition of characters from radicals". This method is briefly described as follows. All the Chinese characters may be constructed from about 750 radicals. Thus, instead of storing the 10,000 characters one can store just 750 radicals and generate each character with a composition algorithm. This method is, however, not as simple as it first appears, as it yields high compaction only if the font is designed with compaction in mind at the expense of some sacrifice in the appearance of the characters. This is so, since the given radical may occupy a different position and a different proportion of the whole Kanji character from one character to the next.

Thus, if only one type of a given radical is used for all the Kanji characters containing this radical, the number of radicals for a set of 10,000 characters is indeed 750, but the appearance of the different Kanji characters composed of this radical do not appear correct to the readers of the Chinese characters. In order to maintain the correct appearance of the characters, one may have to define more than 10 patterns for the same radical, distinguished by different size and relative position of its strokes. This means that the list of radicals increases to more than 7,500. Considering the extra storage space for the character composing instructions, this doesn't result in a great savings as compared to the original 10,000 characters.

Alternatively, one may maintain the radical list at 750 and difine parameters to construct each brush stroke of the radical in exactly the right proportion. Then the radical list is the same 750, but the reconstruction instructions must be increased to include all of the parameters to compose the radicals in the right proportion, as well as the complete Kanji character. Consequently, the overall compaction is again reduced.

BACKGROUND ART

There are a number of known character compaction and generation schemes, which decrease the number of memory locations required to generate a given character set, with each having certain advantages and disadvantages. U.S. Pat. No. 3,999,167 to Ito et al discloses a method and apparatus for generating character patterns such as Kanji characters. According to the teachings of this patent every other dot element in the original character matrix is stored, thereby achieving a reduction of ½ in the required memory allocation for the character generator. It is to be appreciated, however, that there is still an appreciable amount of memory utilized for the generation of the Kanji characters according to Ito et al.

U.S. Pat. No. 3,936,664 to Sato discloses a character generator for generating Kanji characters, with a given Kanji character being broken down into a plurality of vectors, with the X and Y location, the angle, and the length of the vector being stored. The generated character, however, is only an approximation of the original character and, though a reduction of memory is achieved, the memory space required appears to be excessive.

U.S. Pat. No. 3,980,809 to Cook discloses a character generator, where a library of patterns is stored, wherein the pattern to be generated is compared with a table of reference patterns on an element by element comparison basis until the pattern to be generated is found.

U.S. Pat. No. 4,068,224 to Bechtle et al sets forth a symbol generating apparatus for generating symbols from data stored in a storage device, wherein symbols represented by black and white areas are stored in compressed form, with the symbol being divided into columns and rows, with row position values in each column for white/black and black/white transitions being stored for each column, and with the positional values being referred to a coordinate common to all columns.

U.S. Pat. No. 4,125,873 to Chesarek sets forth a display compress image refresh system utilizing a refresh memory store having coded image information segments representing a visual image which is stored in addressable locations.

U.S. Pat. No. 4,173,753 to Chou discloses an input system for a Sino-Computer characterized by dividing the Chinese characters into six basic strokes, i.e., horizontal, vertical, dot, dash, clockwise and counterclockwise, with each kind of stroke being given a corresponding designated numerical symbol, thereby, according to the exact stroke writing sequence of any character to give each character a spelling number to represent the character, to facilitate the input operation. There is, however, no teaching in Chou to utilize patterns having a plurality of length parameters, or to utilize an overlapping technique to enhance the compaction ratio of the system.

U.S. Pat. No. 3,830,965 to Beaudette sets forth apparatus and method for transmitting a bandwidth compressed digital signal representation of a visible image. A pictorial representation is scanned horizontally with the first line being encoded bit wise in a run-length code with the following lines being encoded with referenced to the reference line, utilizing bit wise redundancy coding. In essence, this is a bit wise run-length code with vertical redundancy.

U.S. Pat. No. 3,950,609 to Tanaka et al sets forth a fascimile system which utilizes one dimensional coding with no references being made to a previous line. A first code is generated when the signal components are entirely white, a second signal component is generated when the components are entirely black, and a third signal is generated when the signal components are a mixture of black and white.

U.S. Pat. No. 3,992,572 to Nakagome et al sets forth a system for coding two dimensional information on a bit comparison basis. The white information between characters is compressed, but the information, that is, the black elements, for the characters are not compressed.

U.S. Pat. No. 4,181,973 to Tseng, which is assigned to the assignee of the present invention sets forth a character compaction and generation method an apparatus for Kanji characters. A set of symbols is defined to represent different patterns which occur frequently in the Kanji character set, with there being 61 such symbols disclosed. The information stored for each sparse matrix representing a given character is comprised of each symbol (S) in the sparse matrix, its position (P), and its size parameter (Q), limited to 2 length parameters, if the symbol represents a family of patterns which differ only in size. The P, S and Q parameters are stored in three different read only memories (ROM's). The characters are reconstructed serially from the information stored in the P, S, and Q Rom's.

U.S. Pat. No. 4,286,329 to Goertzel et al, which is assigned to the assignee of the present invention sets forth a complex character generator in which the strokes, vectors and common patterns in a Kanji character are defined by symbols. The result is a sparse matrix representation of the original Kanji character image. Compaction is achieved by storing not the whole character image, but the information on the non zero element in the sparse matrix. The information on the non zero element contains the location P of the non zero element, the type of symbols S for the non zero element, and the size parameter Y of the pattern, where the size parameter is comprised of a plurality of length parameter which may include three or more length parameters. Whereas the complex character generator of Tseng referenced above, operates in a serial fashion such that a given pattern must be decoded and then written before the decoding process of the following pattern is achieved, the complex character generator of Goertzel et al operates in a parallel mode such that as one pattern is being written the following pattern is being decoded and so on. Further, greater compaction is achieved since length parameters having 1, 2 or 3 or more parameters are utilized. The encoding method allows overlapping of portions of two patterns, such that a further increase in compression is achieved.

According to the present invention, a complex character generator is set forth utilizing a byte-scan high speed data compression/decompression scheme which utilizes a two-dimensional byte run-length code. The scheme encodes/decodes the data in an integer multiple of bytes. Namely, an integer multiple of bytes of the data is encoded with one code word. Conversely, an integer multiple of bytes of the original data is generated by decoding of one single code word. Since the data is handled in bytes, and not in bits as in any other scheme, it is more naturally suited to modern digital electronics, either in hardware implementation or software implementation. This is partially responsible for the simple implementation, and fast performance, where the machine does not waste time in converting byte to bit and bit to byte. There is no need to manipulate the decompressed data to fit the byte boundary of a buffer memory. The format of the byte-scan may take two forms and fits for either a single raster scanning I/O or a multi-raster scanning I/O such as a multi-nozzle ink jet, multi-stylus wire or electro-erosion printer head, or even a multi-beam display.

BRIEF DESCRIPTION OF THE DRAWINGS

FIG. 2 is an I row by J column dot matrix, wherein each row is comprised of J bytes, representation for a complex character in a single scanner system;

FIG. 4 comprises three tables which represent the three general coding symbols utilized in the compression of complex characters;

FIG. 6 illustrates the numerical value of each of the bytes of information of the dot matrix of FIG. 5;

FIG. 7 is a table which illustrates the successive symbols to describe the compressed complex character representation of the complex character illustrated in FIG. 5;

FIG. 8 is part of an encode table which sets forth the Huffman code assigned to certain ones of the encoding symbols set forth in the symbol tables of FIG. 4;

FIGS. 9-1, 9-2 and 9-3 when taken together as illustrated in FIG. 9, is a flow chart illustrating how a complex character is compressed;

FIGS. 10-1, 10-2 and 10-3 when taken together as illustrated in FIG. 10, is a block diagram of the complex character compressor illustrated generally in FIG. 1;

FIG. 11 is part of a decode table which illustrates how a compressed complex character which is encoded according to the encode table of FIG. 8 is decoded;

FIGS. 12-1, 12-2 and 12-3 when taken together as illustrated in FIG. 12, is a flow chart illustrating how a compressed complex character is decompressed; and FIGS. 13-1, 13-2, 13-3 and 13-4 when taken together as illustrated in FIG. 12, is a block diagram of the complex character decompressor illustrated generally in FIG. 1.

DISCLOSURE OF THE INVENTION

Method and apparatus for compacting and generating complex characters in a complex character set is described. Each character in a complex character set is defined by an I row and J column dot matrix, wherein each row is comprised of J bytes. Each row of a given character is successively scanned from the first through the Jth byte to determine if the current byte being scanned has the same numerical value as an adjacent preceding byte, for example, the immediately preceding byte in the scanning sequence, or the directly above byte in the same column of the immediately preceding row in the scanning sequence. The number of successively read out sequence of bytes that have the same numerical value as the immediately preceding byte are coded as a single symbold Pn, where n is an integer which is indicative of the number of successive bytes scanned in sequence which are equal in numerical value to each immediately preceding byte. The number of successively read out sequence of bytes that have the same numerical value as the directly above byte are coded as a single symbol Am, where m is an integer which is indicative of the number of successive bytes scanned in sequence which are equal in numerical value to each directly above byte. During the scanning of a successive number of bytes if n and m are equal, the sequence of bytes is coded as a predetermined one of the symbols Pn and Am. If a current byte being scanned is not of the same numerical value as the previous byte or the above byte, it is coded as single symbol Sx, where x is an integer which is indicative of its numerical value. Each of the successively generated symbols Pn, Am and Sx for a given complex character are stored as a compacted complex representation thereof, which can subsequently be decoded to generate the given complex character on a utilization device. In practice, a variable length code word, for example, a Huffman code word is assigned to each of the symbols Pn, Am and Sx.

Best Mode of Carrying Out the Invention

The complex character generator according to the present invention reconstructs an original character image from compacted data representing the original character. The compaction of a character is achieved utilizing byte scanning, wherein the original character is compacted utilizing a two-dimensional byte run-length code. The compaction technique to be described, is applicable to any size character dot matrix. The compaction technique may be utilized, for example, with a 28×22, 28×28, 32×32, 36×36 or any size matrix. By way of example, a representative compaction technique is described as follows for a 32×32 font. Each column is 32 picture elements (PELS) in length, with 32 PELS per row. The system will be described for a single scan apparatus, with each row being divided into 4 one byte wide segments. For a left to right multi-scan apparatus, for example eight scanners, each column is divided into 4 one byte wide segments.

Figure 1:
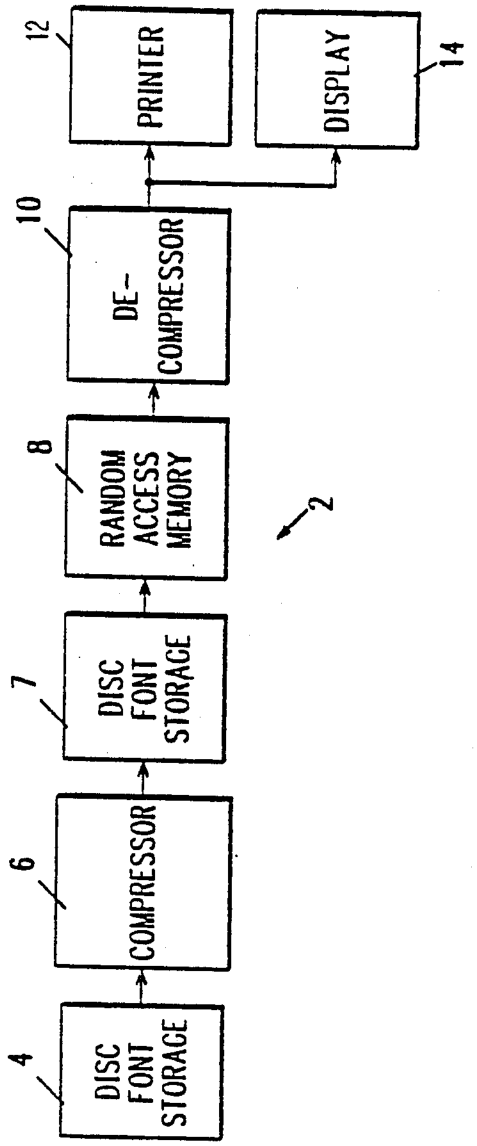
FIG. 1 is a block diagram representation of a complex character generator.

The invention may be more readily understood with references to FIGS. 1 and 2, wherein FIG. 1 is a block diagram representation of the compression/decompression system, and FIG. 2 illustrates how a character matrix is derived. The system is illustrated generally at 2, and the complete original character font is stored in a first disk font storage device 4. The characters are read out a byte at a time per character to a compressor 6 for compacting each individual character, with the compacted characters then being stored in a second disk font storage device 7. Selected compacted characters can then be read out to a storage device such as a RAM 8. The compacted characters selectively stored in the RAM 8 may then be provided to a decompressor 10, with the selectively retrieved compacted characters being decompacted and generated in their original form on a single utilization device such as a printer 12 or a display device 14.

A representative 32 by 32 character matrix for a single element scanner is illustrated in FIG. 2, having I rows, where I ranges from 1 to 32 and J from 1 to 4, with each of the rows being divided into J columns each one byte-wide with there being 4 bytes in a given row.

The compression technique will be explained relative to a single raster scanner, and is accomplished by reading out a given character a row at a time, such that the first row is read out successively bytes 1 through 4 and so on to the 128th byte in the thirty-second row in the matrix. Generally, the compression technique operates as follows. A current (C) byte is compared with an adjacent preceding byte, for example, the immediately previous (P) or preceding byte in the scanning sequence, and the immediately above (A) byte in the same column of the immediately preceding row in the scanning sequence to determine whether or not the current byte has the same numerical value as either P or A. If the current byte has the same value as the previous byte, it is counted, and the succession of such identical bytes is encoded with a symbol Pn, where n is an integer which is indicative of the succession of bytes which have the same value as the previous byte. If the current byte is the same value as the above byte, it is counted, and the succession of such identical bytes is encoded with a symbol Am, where m is an integer which is indicative of the number of successive bytes which have the same value as the above byte. If the current byte being read out, is not of the same numerical value as the preceding or the above byte, it is encoded with a symbol Sx, where x is indicative of the numerical value of the current byte. For example (FIG. 2), a current byte C1 is compared with its immediately preceding byte P1 and its above byte A1, and thereafter in the scanning sequence, another current byte C2 is compared with its previous byte P2 and its above byte A2.

Figure 3:
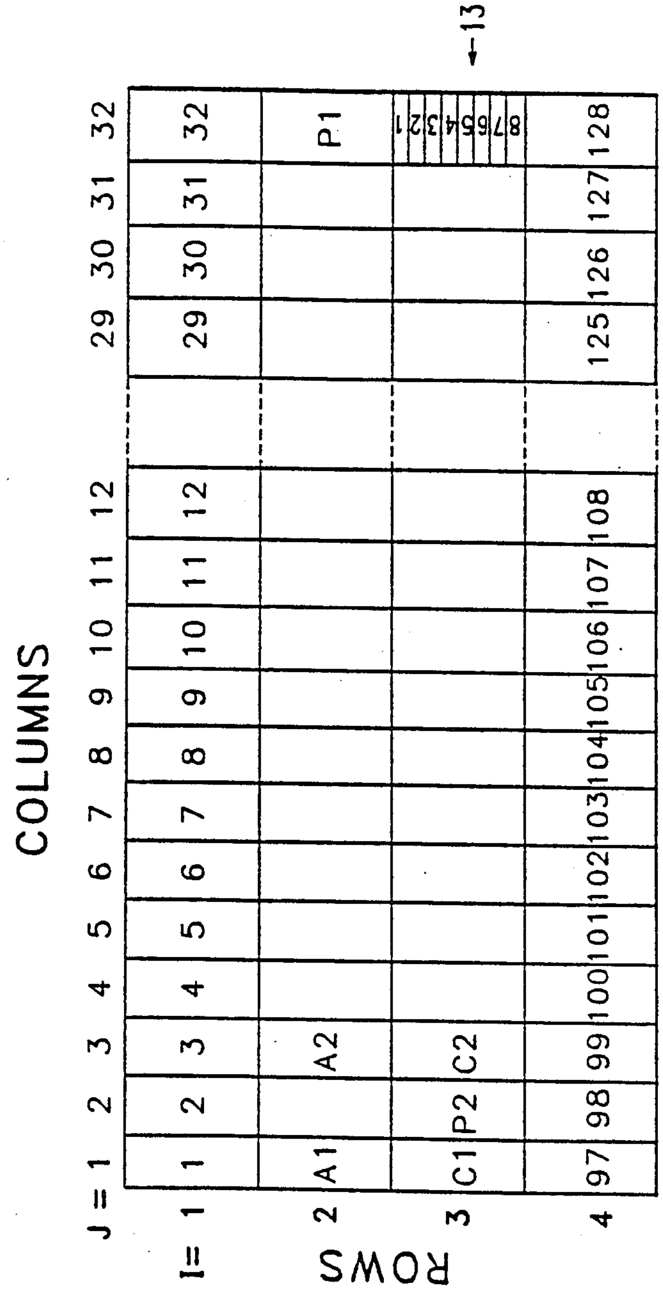
FIG. 3 is an I row by J column dot matrix, wherein each column is comprised of I bytes, representation of a complex character in a multi-scanner system.

A representative 32 by 32 character matrix for a multi-element scanner is illustrated in FIG. 3, having I rows and J columns, wherein I ranges from 1 to 4 and J from 1 to 32. Each column is divided into 4 one byte wide segments. That is, each column position in a given row is eight bits in length as shown at 13, the 32d column position in the 3d row.

The compression technique will now be explained for a multi-element scanner, in this instance and eight element scanner, one element per each bit in a byte. The compression is accomplished by reading out a given character by scanning each row a column position at a time from the first through Ith row, such that the first row is read out successively bytes 1 through 32 and so on to the 128th byte in the fourth row in the matrix. The eight element scanner has the first through eighth scan elements scan the first through eighth bit, respectively, in parallel for each column position in a row. Generally, the compression technique is as follows. A current (C) byte in the column position being scanned is compared with a byte in an adjacent column position For example, the byte in the immediately previous (P) or preceding column position in the scanning sequence, and the byte in the immediately above (A) column position in the same column of the immediately preceding row in the scanning sequence, to determine whether or not the byte in the current column position has the same numerical value as either P or A. If the byte at the current column position has the same value as the byte in the previous column position, it is counted, and the succession of such identical bytes is encoded with a symbol Pn, where n is an integer which is indicative of the succession of bytes which have the same value as the byte in the previous column position. If the current byte is the same value as the byte in the above column position, it is counted, and the succession of such identical bytes is encoded with a symbol Am, where m is an integer which is indicative of the number of successive bytes which have the same value as the byte in the above column position in the scanning sequence. If the byte being read out at the current column position is not of the same numerical value as the byte in the preceding or above column position, it is encoded with a symbol Sx, where x is indicative of the numerical value of the byte in the current column position being scanned. For example (FIG. 3) a byte C1 in the current column position is compared with a byte P1 in the preceding column position and a byte A1 in the above column position, and thereafter in the scanning sequence a following byte C2 in the current column position is compared with a byte P2 in the preceding column position and with a byte A2 in the above column position.

FIG. 4 comprises symbol tables illustrating the coding symbols Pn, Am and Sx utilized for coding a given complex character. A Pn table 16 is comprised of 4 previous byte symbols P1–P4 with these symbols being represented by numerical values 301–304 respectively in a read out table to be described shortly. Four such symbols are illustrated for purposes of example only, as it is to be appreciated fewer or greater numbers of Pn symbols could be utilized as a design choice. An Am table 18 is comprised of 8 above byte symbols A1–A8, with these symbols being represented by numerical values 401–408, respectively in another read out table to be described shortly. It is to be appreciated that a greater or lesser number of Am symbols may be utilized as a design choice. A Sx table 20 is comprised of 256 possible symbols a current byte, may be represented by. These symbols are S1–S256, with S1–S255 representing the numerical values 1–255 respectively, with S256 representing the 0 binary value for easier understanding of the table read out.

Figure 5:
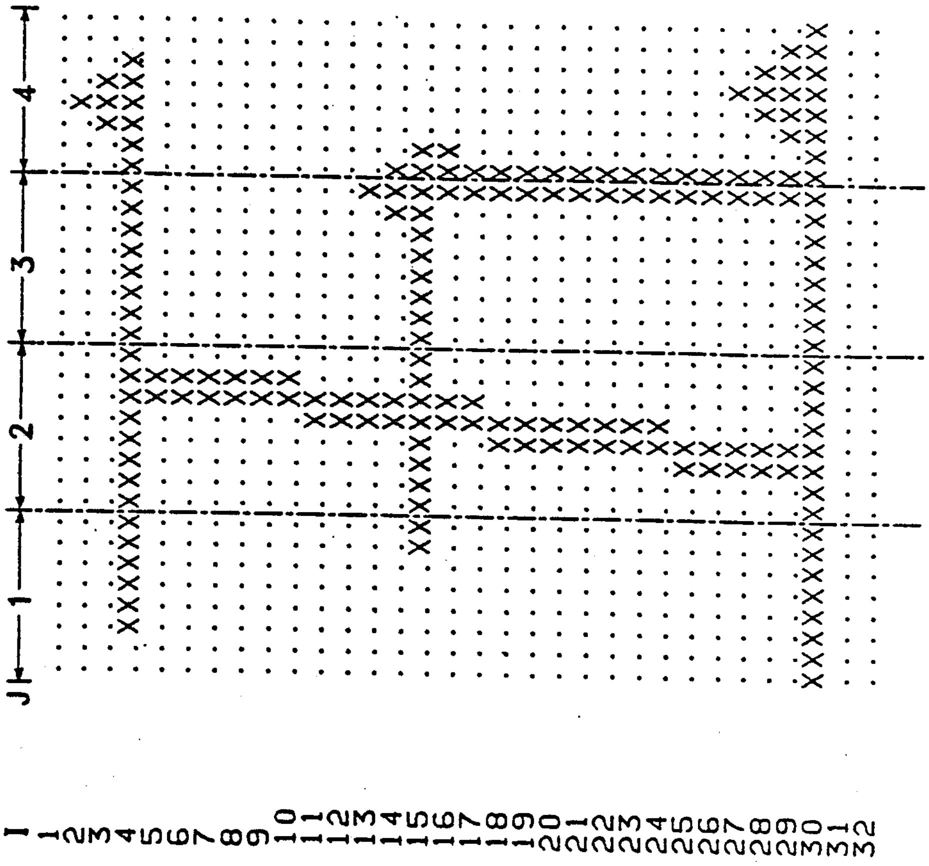
FIG. 5 is a dot matrix representation of a given complex character, wherein the dot matrix is an I row by J column matrix, with each row comprised of J bytes.

FIGS. 5, 6 and 7 should now be considered jointly as an example of how a given complex character is compressed according to the present invention. In FIG. 5, a Kanji character is chosen as the representative complex character. FIG. 6 is another representation of the Kanji character of FIG. 5, in which each of the 128 bytes of the character dot matrix are assigned their respective numerical values of 0–255 with respect to the number of PELS in a given byte. It is seen that there are no PELS in the first row, and accordingly each of the bytes in this row have a numerical value of 0. In the second row, the first three bytes also have a numerical value of 0. The fourth byte in this row has a PEL at the fifth bit position, which is a numerical value of 16. The character matrix of FIG. 5 may be scanned row by row to ascertain the numerical values shown.

As previously set forth, the original character matrix is scanned row by row from the first through the fourth byte down to the thirty-second row and finally to the 128 byte to compact the original character. When scanning the first row, a reference value is needed which is four bytes wide to compare the current byte being scanned with a reference previous and above byte. For purposes of description, the reference row is chosen to have a 0 numerical value in each of the four byte positions. Therefore, as the first row is scanned from the first to the fourth byte position, the current byte has the same numerical value as the previous byte and the above byte, for each byte position in the first row, and for the first three byte positons of the second row. It is seen, therefore, that the succession of bytes for the first row could be encoded as either P4 or A4. When Pn and Am are equal, it is chosen to encode as the Am value, so the Am comparison continues for three more bytes. Accordingly, the first seven bytes are encoded as A7 which is indicated at position 1 in the compressed complex character table of FIG. 7. At byte 4 in row 2, the numerical value of the byte is 16 which does not compare with the previous byte or the above byte, and accordingly, this current byte is encoded as symbol S16 as indicated at position 2 of FIG. 7. The scanning sequence then goes to row 3 where the first 3 bytes have the same numerical value as the above byte, and accordingly the next symbol is encoded as A3 as indicated at position 3 in FIG. 7. The fourth byte in row 3 has a numerical value of 56, which does not compare with the previous or the above byte, and this symbol is encoded as its numerical value S56 at position 4 of FIG. 7. This scanning sequence continues to the thirty-second row, where the final symbol in the character matrix is encoded as A3 which is indicated at position 49 in FIG. 7. It is seen that utilizing the byte scanning technique that the 1028 possible bits of the character matrix of FIG. 5 are reduced to a compacted character of 306 bits utilizing a Huffman type code word assignment.

FIG. 8 sets forth an encoding table for providing a Huffman code word assignment for the respective symbols Pn, Am and Sx. As is known in Huffman coding, a symbol which has the highest probability of occurrence is assigned a code word with the smallest number of bits, with a given code word never being a prefix for a following code word. The symbol which has the highest probability of occurrence is the symbol A1 which is assigned a three bit wide code at address 1, with the code being 011. It is seen that the successive code words having the highest probability of occurrence after A1 are S0, A2, S255, S24, P1 and so on.

As previously set forth, for each byte there are 256 possible code words, and there are 128 bytes in a representative complex character matrix. The following definitions are assumed in describing a compaction or compression sequence for a single scanner:

(1) C=current byte=S(K), where K=1 to 128.

(2) A=byte above=S(K−N), where N=4.

(3) P=previous byte=S(K−1).

The character matrix (M) of I rows and J columns is defined as:

(4) M(I,J), where I=1 to 32, J=1 to 4.

A given byte S(K) is defined as follows:

(5) S(K), where K=J+(I−1).4.

For the first byte in the third row.

$$S(K),\ K = 1 + (3 - 1) \cdot 4 \qquad (6)$$
$$K = 9$$
$$S(K) = S9,\ \text{the ninth byte.}$$

For a multi-scanner as shown in FIG. 3, the compression sequence is as follows:

(1) C=current byte=S(K)=1 to 128.

(2) A=above byte=S(K-N) where N=32.

(3) P=previous byte=S(K−1).

The character matrix (M) of I rows and J columns is defined as:

(4) M(I,J), where I=1 to 4, J=1 to 32.

Refer now to FIG. 9, which is a flowchart illustrating the compression sequence for a given complex character. As previously set forth, the first row to be compressed is compared to a reference row of all zeros in the four byte positions K=1 to 4. Accordingly, the system is initialized at K=5. An A Counter (AC), P Counter (PC), an A Stop and P stop are all set to zero. The A counter and P counter count the number of bytes that have the same numerical value as the above and previous bytes, respectively, in the scanning sequence. The A stop and P stop are indicative of a current byte being scanned as not being equal to the above byte or previous byte, respectively. This will be more apparent relative to the block diagram of FIG. 10.

As set forth above, the system flowchart is initialized with K=5 as indicated at 22, with the logic process then proceeding to logic block 24 to determine if the P stop=1. Since the system was just initialized, the P stop is equal to 0, therefore the logic process proceeds to logic block 26 to determine if the A stop is equal to 1. Again, since the system was just initialized the A stop is equal to 0, and the logic proceeds to logic block 28 to determine if the current byte S(K) is equal to the directly above byte S(K−N). If the current byte is not equal to the above byte the logic process proceeds to logic block 30 where the A stop is then set equal to 1, and then proceeds to logic block 32 where the current byte S(K) is examined to see if it is of the same numerical value as the previous byte S(K−1). If the current byte is not of the same numerical value as the previous byte the logic process proceeds to logic block 34 where the P stop is set equal to 1. If, on the other hand, the current byte is of the same numerical value as the previous byte, then the PC counter is incremented by 1 as indicated at 36.

Assume that the current byte being scanned is of the same value as the above byte as determined in logic block 28, then the logic process proceeds to logic block 38 where the above counter AC is incremented by 1, and then to logic block 40 where it is determined whether or not the current byte is also equal to the previous byte. If the current byte is not equal to the previous byte, the P stop is set to 1 as indicated at 42. If, however, the current byte is also the same as the previous byte, the logic process proceeds to logic block 44 where the P counter is incremented by 1.

When the PC counter has been incremented or the P stop set equal to 1 as indicated at logic blocks 36, 42 and 44, the logic process then proceeds to logic block 46 to increment the system to the following byte. At logic block 48, it is then determined whether or not the current byte is less than or equal to the last byte in the matrix, in this instance 128. In this instance K is less than 128 and the logic process returns to logic block 24 to determine whether or not the P stop is equal to 1. Assuming that the P stop is not equal to 1, the logic process again proceeds to logic block 26 to determine if the A stop is equal to 1. Assuming that the A stop is equal to 1, the logic process would then proceed to logic block 50 to look at the previous byte to determine if the current byte has the same numerical value. If the numerical value is not the same, the P stop is set to 1 as indicated at logic block 52. On the other hand, if the current byte is of the same value of the previous byte the PC counter would be incremented by 1 as indicated at 52 and the logic process would then proceed to logic block 46 and then to 48 and back to logic block 24.

Assuming in this instance that the P stop had previously been set to 1, the logic process would then proceed from logic block 24 to logic block 56 to determine if the current byte being scanned is equal to the above byte. If the current byte being scanned is not the same numerical value as the above byte then the A stop would be set to 1 as indicated at logic block 58. On the other hand, if the current byte has the same numerical value as the above byte the logic process would then proceed to logic block 60 to increment the AC counter by 1 and then to logic blocks 46 and 48.

In the instances where the P stop or the A stop has been set to 1, which is indicative of the end of a sequence of current bytes being scanned having the same numerical value as the above or previous byte, the logic process proceeds to logic block 62 to determine if AC is greater than or equal to PC. If PC is greater than AC, the logic process then proceeds to logic block 64 where the symbol is encoded as PC, and is provided on line 66 to the output coder. On the other hand, if AC is greater than or equal to PC the logic process proceeds to logic block 68 to determine whether or not AC equals 0. If AC is not equal to zero, the logic process to logic block 70 where the symbol is encoded as AC and is then provided on output line 66 to the output coder.

On the other hand, if AC equals 0, PC also is equal to 0 which is indicative of the current byte not being equal to the previous or the above byte, and the logic process then proceeds to logic block 72 to encode the symbol as S(K), which is indicative of the numerical value of the current byte with this value then being provided via line 66 to the output coder.

In each instance following the generation of a symbol at either one of logic blocks 64, 70 or 72, the logic process then proceeds to logic block 74 to determine if the current byte is less than the last byte in the matrix. If the final byte in the matrix has not been reached the logic process then returns to starting point 22 via line 76 to continue the scanning sequence. On the other hand, if this is the 128th byte, this is the end of the character generation as indicated at 78.

FIG. 10 is a block diagram of the compactor or compressor circuit of the present invention. The 128 bytes comprising a given complex character are stored in a storage device such as a linear memory 80 to be scanned or read out successively a byte at a time from the first through thirty-second row of the complex character matrix. It is to be appreciated that a number of different read out technologies could be utilized for scanning the character, such as electronically reading out from a storage device, optically reading out from a storage device or the like.

Each byte is successively read out from the storage device 80 to a 1 byte-wide input shift register 82. A shift register buffer 83 is comprised of four one-byte-wide shift register stages 84, 86, 88 and 90. That is, the number of stages of the shift register buffer 83 are equal to the number of bytes in a given row of the complex character matrix. Initially, the shift register buffer has all stages thereof set to a numerical value of zero, such that each byte in the first row of a character matrix is compared with a reference value when determining if the current byte being scanned in the first row has the same numerical value as an above byte or a previous byte, as previously set forth. When the first byte is stored in the input shift register 82 the numerical value of the byte in the shift register 82 is provided to first inputs 92 and 94 of comparators 96 and 98 respectively, and to a latch 152. The comparator 96 is utilized to compare the current byte being scanned, that is the byte stored in shift register 82 with the above byte in the scanning sequence, that is the byte stored in shift register stage 90. The comparator 98 is utilized to compare the value of the current byte being scanned, that is the byte stored in shift register 82, with the immediately preceding or previous byte in the scanning sequence stored in shift register stage 84. The function of latch 152 will be described shortly.

With reference to the compacting or compressing of the complex character matrix as illustrated in FIGS. 5 and 6, the comparators 96 and 98 would determine that the current byte had the same value as the previous byte and above byte for the first 7 bytes of information scanned indicating the symbol A7 should be encoded. Each time the comparators 96 and 98 detect equality, the OR-gates 100 and 102 are respectively made active at clock time to provide an incrementing count pulse to AC counter 104 and PC counter 106 respectively. The active states of OR-gate 100 and 102 are also provided to an OR-gate 108 for decrementing a down counter 110 which is initially set at a count of 128. The output of OR-gate 108 is also provided via lines 112 to the input shift register 82 and the shift register buffer 83 for shifting the bytes of information therein to the following stages. At byte 8 in the scanning sequence, the numerical value of the byte is 16 which is not equal to the previous or the above byte, and the comparators 92 and 98 provide signals which are indicative of this condition to OR-gates 114 and 116 respectively which become active to make active OR-gates 118 and 120 at clock time for stopping the AC counter 104 and the PC counter 106 respectively. A comparator 122 has been comparing AC and PC during each byte scanning sequence with the results of the comparison being provided to a latch network 124. When the current byte being scanned is not equal to the previous or the above byte, as indicated by the active state of OR-gates 114 and 116, and AND-gate 127 is made active, which for in turn activates an AND-gate 129 at clock time for reading out the contents of the latch 124. The active state of gate 128 also resets AC counter 104 and PC counter 106.

If PC is greater than AC, line 126 is active, if AC is greater than PC line 128 is active, and if AC equals PC line 130 is active. The concurrence of active states on lines 129 and 130 activates AND-gate 132 for providing an active state on line 134 which is indicative of AC being greater than or equal to PC. If line 130 is active and AC and PC are both equal to zero as indicated by the active state of line 136, AND-gate 138 becomes active for in turn activating line 140. The lines 126, 134 and 140 are provided to a class coder 142 which looks at the state of the three input lines for providing two output lines 144 and 146 with binary coding states which are provided to a selector network 148 and a programmed logic array (PLA 150). The input lines 126, 134 and 140 are designated as b3, b2 and b1, respectively, and the output lines 144 and 146 are designated as a2 and a1, respectively. Logic Table 1 below illustrates which binary conditions of the lines b1, b2 and b3, provide the binary states indicated for the output lines a1 and a2.

TABLE 1

| INPUT | | | OUTPUT | | | |
|---|---|---|---|---|---|---|
| b1 | b2 | b3 | a1 | a2 | | |
| 1 | 0 | 0 | 0 | 0 | → | S (X) |
| 0 | 1 | 0 | 0 | 1 | → | Am |
| 0 | 0 | 1 | 1 | 0 | → | Pn |

As previously set forth, the value of the current byte being scanned is provided from the input shift register 82 to a latch 152, the count of the AC counter 104 is provided to a latch 154 and the count of the PC counter 106 is provided to a latch 156. The binary state of the lines 144 and 146 cause a selector to read out the appropriate value from one of the latches 152, 154 and 156 according to table 1 to the programmed logic array 150. Each of the successively scanned bytes and the code values as set forth in FIG. 7 are stored in the PLA 150 so that the output of the PLA is the Huffman code word assigned to each symbol Pn, Am or Sx. A selected character, for use by utilization device, may then be read out to a buffer 152, to line 154 and then to the utlization device.

The output of the OR-gate 138 is also provided to the OR-gate 108 to decrement the counter 110 each time AC equals PC equals zero, which is indicative of a current byte not being equal to the previous or the above byte. The coded output of the down counter 110 is provided to an OR-gate 156 and then to inverter 158 for sensing when the down counter has reached a count of 128, which is indicated by the active state of the inverter 158 for providing an end of character signal on line 160 for resetting a1 of the appropriate devices in the compressor.

FIG. 11 is part of a decode table utilized for decoding the Huffman code representing a given compressed complex character, and is utilized in the decompression or decompaction operation. The table is comprised of consecutive addresses of 1 through X, where X is the maximum address in the table, with each address having a T0(A) column which is accessed when a given bit in the code word is a binary 0, and a T1(A) column which is accessed when a given bit is a binary 1. In the table the number in the T0A or T1A column is the next address in the table to be accessed if the number is not preceded by a minus sign. However, if the number is preceded by a minus sign this is indicative of the number of the symbol to be read out of the table. A plurality of symbols which are read out of the table comprise a given complex character. As an example of how the table is used, the reading out of the symbol P1 will be described. From the encode table on FIG. 8, it is seen that the P1 symbol is represented by the number 301 as indicated at address 7, and has a 5 bit binary value of 10001. The binary number is read serially into the table from the left most bit to the right most bit, with the table first being accessed at address 1. The first bit, that is the left most bit is a binary 1 value, therefore column T1A is accessed as indicated at 162 which points at address 3 in the table. The second bit is a binary 0 value, therefore, the T0A column is accessed as indicated at 164 which points to address 6 in the table. The third bit is a binary 0 and the T0A column is again accessed as indicated at 166 which points to address 11 in the table. The fourth bit is a binary 0, therefore, the T0A column is accessed as indicated at 168 which points to address 21 in the table. The fifth bit is a binary 1, therefore, the T1A column of the table is accessed as indicated at 170 which points to the number −301. Therefore, the symbol for 301, that is P1, is read out from the table. All other symbols are accessed and read out of the table in a like manner.

FIG. 12 is a flowchart for the decompressor or decompactor of the present invention, utilizing a decode table as set forth relative to FIG. 11. To start the decompression of a character, a byte counter C1 is set to a value of 128 as indicated at logic block 172. This byte counter then will be decremented each time a byte of the complex character is reconstructed. The logic process then proceeds to logic block 174 to set a bit counter C2 to 8. This bit counter C2 is decremented each time a bit of the Huffman code is read into the decompressor network. A byte of compressed data is read out of the programmed logic array as indicated at logic block 176. The address in the decoding table is initially set to an address A=1 as indicated at logic block 178. This is in accordance with starting at the first address in the decode table as set forth in the explanation relative to FIG. 11. The first bit is then shifted out from the 1 byte of data as indicated at 180 and then the bit counter C2 is decremented by 1 as indicated at 182 to indicate that the first bit is being tested. The bit is then tested to see if it is 0 as indicated at logic block 184 to determine whether to access the T0A column or the T1A column in the decode table If the bit is equal to 0, the logic process then proceeds to logic block 186 to determine if the bit in the T0A column is negative, that is, is this indicative of symbol to be read out. If the number in the T0A column is negative, the logic process proceeds to logic block 188 to read out the negative number in the T0A column. If the number in the T0(A) column is not negative, the logic process proceeds to logic block 189 to replace this address by the address pointed to in the T0(A) column. The logic process then returns to logic block 180 to test the bit at this address.

Returning to logic block 184, if the bit being tested is not equal to 0, that is the bit is equal to 1, the logic process would proceed to logic block 190 to determine if the number in the T1A column is negative. If the number is negative which is indicative of a symbol to be read out the logic process then proceeds to logic block 192. On the other hand, if T1A is not negative, the logic process would proceed to logic block 194 to replace the address by the address pointed to in the T1A column with the logic process then proceeding back to logic block 180 to shift in the next bit to be tested.

When the logic process had proceeded to either logic block 188 or 192 which is indicative that symbol should be read out, the logic process then proceeds to logic block 196 to determine if the value of the number is greater than 256, that is, is the number indicative of a Pn or a Am code. If the number is greater than 256 the logic process then proceeds to logic block 198 to determine if the numerical value is greater than 400. If the numerical value is greater than 400, the logic process then proceeds to logic block 200 to read out the Am code represented by this number, with this number then being outputted on output line 202. If the numerical value is not greater than 400, this is indicative of it being a 300 or Pn code and the logic process proceeds to logic block 204 with the appropriate P code then being read out on the line 202.

Returning to logic block 196, if the numerical value is not greater than 256, this is indicative of the current byte not having the same numerical value as the previous or an above byte. The logic process then proceeds to logic block 206 to determine if the numerical value is equal to 256. If the numerical value is equal to 256, this is indicative of a numerical value of 0 and the logic process proceeds to logic block 208 with the numerical value of 0 being then outputted on the line 202. If the numerical value is not equal to 256 the logic process proceeds to logic block 210 to read out the numerical value represented by the appropriate symbol S on the line 202, that is the appropriate symbol of S1–S255. After a given symbol is read out on a line 202, the logic process proceeds to logic block 212 to determine if i is equal to 0, that is has the bit counter been decremented from 8 to 0. If the answer is no, the logic process returns to logic block 178 via line 214 to set the decode table to address A1 and to once again proceed through the logic process until the following symbol is decoded. If on the other hand, the bit counter C2 has been decremented to 0 the logic process would proceed to logic block 214 to decrement the byte counter C1 by 1 with the logic process then proceeding to logic block 216 to determine if the C1 byte counter is equal to 0. If C1 is not equal to 0, the logic process returns to logic block 174 to reset the bit counter C2 to 8, with the logic process then repeating. If on the other hand, C1 is found to be 0, this is indicative of the generation of the end of a character as indicated at 218.

FIG. 13 is a block diagram representation of a decoder according to the present invention for decompressing or decompacting selected characters for generation on a utilization device. The decoder is initialized by the application of a start pulse to AND-gate 220, and OR-gates 222 and 224. In response to the concurrent application of a clock pulse to the AND-gate 220, a shift register 226 has a byte of compressed data in the form of one or more code words applied thereto from a storage device 228, which for example may be a random access memory (RAM) or a read only memory (ROM).

The OR-gate 222 provides the start pulse to AND-gate 230, and responds to the concurrent application of a clock pulse to the other input thereof. The gate 230 provides a reset pulse to an address latch 232 for latching in the initial or first address in the latch, which points to a selected address in a decode table 252.

The OR-gate 224 in response to the start signal provides a reset signal on line 234 to the reset input of one-byte wide register stages 236, 238, 240 and 242 of a storage register 244 which stores a row of information for the subsequent generation of a character.

A bit at a time of the byte of data stored in the register 226 is read out on output line 246 in response to a read out pulse on line 248 from an AND-gate 250 which provides an output each time a bit of information is processed by the decoder table 252. The pulse output from the AND-gate 250 is also provided to a down counter 254 which is initially set to a count of eight and is decremented in response to each bit selecting an address in the decoder table 252. An OR-gate 256 provides an active output until the down counter 254 is decremented to a zero value, at which time the OR-gate 256 becomes inactive, and an inverter 258 provides a load pulse on line 260 to the input register 226 for loading the next byte of coded compressed data from the storage device 228.

The decoder table 252 is comprised of a T0(A) and T1(A) column which is accessed a bit at a time, as described relative to the decode table of FIG. 11, to select the appropriate code word to be decoded. The decode table 252 includes in each column control bit positions 260, 262 and 264. Control bit 260 is indicative of whether the present address being pointed at is pointing to a subsequent address in the table or is indicative of a code word. That is, if the control bit 260 is 1 the number in the decode table is negative which is indicative of the number of a code word to be decoded. If the bit 260 is 0, which is indicative of a positive number, the table is pointing to the next address to be accessed The bits 262 and 264 are used to indicate whether the symbol being decoded is Pn, Am or Sx, as will be described in more detail shortly.

As each bit is read out on line 246 from shift register 226, this bit of information is provided to a select network 266 for reading out the information from table 252 which is pointed at by the address latch 232. As previously stated, the latch 232 initially points at the first address in the table, with the bit applied to the select network 266, if it is a binary ZERO selecting the ZERO column T0(A) or if the bit is a ONE, selecting the ONE column T1(A) at the first address The selected column at the first address is read out from table 252 to the select network 266 to a register 268 which includes the previously described control bits at positions 260', 262' and 264'. Assuming the control bit 260' is at a ZERO level, this means that the first address points to a subsequent address. This ZERO level disables an AND-gate 270, and is also inverted by an inverter 272 for applying a pulse to AND-gate 250 for decrementing the down counter 254. The pulse from inverter 272 is also applied to AND-gate 274, which becomes active at the next clock pulse for latching in the address present on line 276 from the register 268 in address latch 232. The number read out of register 268 is not latched into a latch network 278 at this time since the AND-gate 270 is disabled.

The network just described advances from one pointed to address to the next in table 252 until a negative number is found which is indicative of a code word to be read out as indicated by a binary one in the bit position 260'. The AND-gate 270 is then enabled and the number in register 268 is latched into the latch network 278. The number latched into latch network 278 is indicative of one of the symbols Pn, Am or Sx. The control bits 262' and 264' are indicative of which symbol is stored in latch 278, as set forth below.

The active state of gate 270 also decrements a down counter 280. This counter is initially preset to a count of 127, and it is decremented to 0, this is indicative of all 128 bytes in the character presently being decoded having been processed. In response to the counter 280 having been decremented to 0, an OR-gate 280 provides a ZERO output to an inverter 282 which provides a pulse to reset the counter 280 to a count of 127 via the line 284. This pulse is also provided to the OR-gate 224 to in turn reset the register 244.

The latch 278 besides including the numerical value of the code word includes the control bits 262' and 264' which are indicative of whether the numerical value stored in the latch 278 is the symbol Sx, Am, or Pn, in accordance with Table 2 below. The bit on the left is 262' and the bit on the right is 264'.

TABLE 2

| | |
|---|---|
| Sx | 00 |
| Am | 01 |
| Pn | 10 |

Assume that the symbol Sx is stored in the latch 278. Therefore, bits 262' and 264' are both at a ZERO level such that an OR-gate 286 is providing a ZERO output thereby disabling an AND-gate 288. The number on line 292 is not latched into the down counter 290 as the AND-gate 288 is disabled at this time. The binary numbers from the stages 262' and 264' are applied via lines 296 and 298 respectively to a select network 294. Since the down counter 290 did not have a number latched in, it is at a count of 0, and an OR-gate 300 is disabled and provides a ZERO level select signal on line 302 to the select network 294. This ZERO level is inverted by an inverter 304 which is applied to the AND-gate 250 and the AND-gate 270. Since the line 302 is at a zero level and as are lines 296 and 298, the select network 294 selects the symbol on line 292 as set forth in the Table 3 below. The bits from left to right are 262', 264' and the select signal on line 302.

TABLE 3

| | |
|---|---|
| Sx | 000 |
| Am | 011 |
| Pn | 101 |

The symbol on line 292, which is indicative of one of the symbols Sx, is then passed by the select network 294 to a first stage 306 of a shift register 308 which includes register stages 310, 312 and 314. The output of the select network 294 is also provided to first stage 236 of the register 244 It is seen that the output of register stage 236 is provided via line 316 to select network 294 as the symbol Pn, and the output of shift register stage 242 is provided via line 318 to select network 294 as the symbol Am. Each time that a symbol is latched into the latch network 278 via the pulse from the gate 270, this pulse is also provided to each stage of the shift register 308 for shifting the bytes of data to each subsequent stage, and is also applied to a MOD 4 counter 320, which when it reaches a count 4, is indicative of a row of four bytes of information being generated. A latch pulse is provided via line 324 to a register 326 for latching in the character line of information from the shift register 308 in response to the generation of the latch pulse. This line of information can then be read out via a line 328 to a signal utilization device.

Consider the instance when the piece of information latched into the latch network 278 is the Am signal which is indicated by a binary value of 01 as shown in table 2. In this instance the OR-gate 286 becomes active for applying a pulse to the AND-gate 288, which also has an active signal applied to the other input thereof, for latching in the Am number in the latch 278 into the down counter 290. At this time, the signals on lines 296 and 298 respectively are at a 0 and a 1, and the signal on line 302 is a binary 1, since the count in the down counter 290 is not 0, such that the select network 294, in accordance with table 3, passes the byte of Am information on line 318 to shift register stage 306 and to shift register stage 236 of register 244.

Consider the instance when the Pn signal is latched into the latch network 278. In this instance in accordance with table 2, the signals on lines 296 and 298 are 1 and 0 respectively with the signal on line 302 being a 1 since the count in the down counter 290 is not 0, and the select network 294 in accordance with table 3, selects the Pn signal on line 316 from latch network 244 to be passed by the select network into the first shift register stage 306 of register 308 and to first register stage 236 of the register 244.

It is seen therefore, that successive bytes of coded compressed data are read out from the storage device 228 to the shift register 226, with each bit of the byte of information then being read out serially for accessing the decoder table 252 to determine which code word is to be read out for subsequently forming the complex character to be generated as set forth above.

Industrial Applicability

It is an object of the invention to provide an improved compression/decompression for complex characters.

It is another object of the invention to provide an improved complex character generator.

It is yet another object of the invention to provide an improved complex character generator utilizing byte scanning.

It is still another object of the invention to provide an improved complex character generator utilizing a two-dimensional byte run-length code.

It is a further object of the invention to provide an improved complex character generator wherein an integer multiple of bytes of the data describing a complex character is encoded with one code word and conversely an integer multiple of bytes of the original data is reconstructed by decoding of one single code word.

It is still a further object of the invention to provide an improved complex character generator wherein a complex character is defined by an I row and J column dot matrix, wherein each row is comprised of J bytes, and the complex character is scanned a byte at a time and compared with an adjacent preceding byte in the scanning sequence to determine if the byte currently being scanned has the same numerical value as the adjacent byte. The number of successively read out sequence of identical adjacent bytes are coded as a single first symbol. If there is no identity in bytes, the byte being scanned is assigned a second symbol which is indicative of its numerical value.

It is yet a further object of the invention to provide an improved complex character generator wherein a complex character is defined by an I row and J column dot matrix, wherein each row is comprised of J bytes, and the complex character is scanned a byte at a time and compared with the immediately preceding and directly above byte to determine if the byte currently being scanned has the same numerical value as either. The number of successively read out sequence of identical immediately preceding or directly above byte are coded as a single symbol Pn or Am, respectively. If there is no identity in bytes, the byte being scanned is assigned a symbol Sx, where x is an integer which is indicative of its numerical value. The symbols are decoded to generate a complex character.

Having thus described my invention, what I claim is new, and desire to secure by Letters Patent is:

1. A method of compacting a complex character, wherein said character is defined by an I row by J column matrix, wherein each row is comprised of J bytes, where I and J are integers, said method comprising the steps of:

scanning each row a byte at a time to concurrently determine if a given byte of any numerical value has the same numerical value as the previous byte in the scanning sequence or has the same numerical value as the above byte in the same column and immediately preceding row;

encoding the number of successive bytes that are the same numerical value as the previous byte as a symbol Pn, where n is an integer which is indicative of the number of given bytes scanned in sequence which are equal in numerical value to the previous byte;

encoding the number of successive bytes that are the same numerical value as the above bytes as a symbol Am, where m is an integer which is indicative of the number of given bytes scanned in sequence which are equal in numerical value to the above bytes; and encoding any given byte, which is not of the same numerical value as the previous byte or the above byte, with a symbol Sx, where x is indicative of the numerical value of said any given byte.

2. A method of compacting a complex character, wherein said character is defined by an I row by J column matrix, wherein each row is comprised of J bytes, where I and J are integers, said method comprising the steps of:

scanning each row successively a byte at a time to determine if the current byte being scanned has the same numerical value as the immediately preceding byte in the scanning sequence, or has the same numerical value as the directly above byte in the same column of the immediately preceding row, or has a numerical value different than the immediately preceding byte or the directly above byte;

encoding the number of successively scanned bytes that have the same numerical value as the immediately preceding byte as a single symbol Pn, where n is an integer which is indicative of the number of successive current bytes scanned in sequence which are equal in numerical value to each immediately preceding byte;

encoding the number of successively scanned bytes that have the same numerical value as the directly above byte as a single symbol Am, where m is an integer which is indicative of the number of successive current bytes scanned in sequence which are equal in numerical value to the directly above byte in the same column of the immediately preceding row;

encoding the number of successively scanned bytes as a predetemined one of Pn and Am when n and m are equal; and encoding any current byte, which is not of the same numerical value as the immediately preceding byte or the directly above byte, with a symbol Sx, where x is indicative of the numerical value of said current byte.

3. The method of claim 2, including the step of:

storing in binary form the symbols Pn, Am and Sx comprising a given compacted complex character.

4. The method of claim 3, including the step of:

generating on a utilization device a given complex character in response to retrieving and decoding the symbols Pn, Am and Sx in binary form comprising said compacted complex character.

5. In apparatus for compacting a complex character, wherein said character is defined by an I row by J column matrix, wherein each row is comprised of J bytes, where I and J are integers, the combination comprising:

means for storing a complex character font in a storage device;

means for reading out a given complex character in said font a byte at a time from the first through the Jth byte successively from the first through Ith row to determine if the current byte being scanned has the same numerical value as the immediately preceding byte in the read out sequence, or has the same numerical value as the directly above byte in the same column of the immediately preceding row, or has a numerical value different than the immediately preceding byte or the directly above byte;

means for encoding the number of successively read out sequence of bytes that have the same numerical value as the immediately preceding byte as a single symbol Pn, where n is an integer which is indicative of the number of successive current bytes read out in sequence which are equal in numerical value to each immediately preceding byte;

means for encoding the number of successively read out sequence of bytes that have the same numerical value as the directly above byte as a single symbol Am, where m is an integer which is indicative of the number of successive current bytes read out in sequence which are equal in numerical value to each directly above byte;

means for encoding the number of successively read out sequence of bytes as a predetermined one of Pn and Am when n and m are equal;

means for encoding any current byte read out, which is not of the same numerical value as the immediately preceding byte or the directly above byte, with a symbol Sx where x is indicative of the numerical value of said current byte; and means for storing the successively generated symbols Pn, Am and Sx for said given complex character as a compacted complex character representation of said given complex character.

6. The combination claimed in claim 5, including:

means for generating on a utilization device said given complex character in response to retrieving said compacted complex character from said means for storing and decoding the symbols Pn, Am and Sx comprising said compacted complex character.

7. An apparatus for compacting complex characters in a complex character font, wherein each character is defined by an I row by J column matrix, wherein each row is comprised of J bytes, where I and J are integers, the combination comprising:

a first storage device in which each complex character is stored in an uncompacted form;

a first input shift register in which a byte at a time from the first through the Jth byte successively, from the first through Ith row of a given complex character, which is read out of said first storage device, is successively stored;

a J stage second shift register which receives each successive byte from said first input shift register, with each successive byte being shifted from the first input shift register to the first stage of said second shift register to each successive stage thereof and thence to the Jth stage thereof;

a first comparator for comparing the current byte stored in said first storage input shift register with the immediately preceding byte stored in the first stage of said second shift register to determine if they have the same numerical value, with a first compare signal C1 being provided when they compare, and a first non-compare signal N1 being provided when they don't compare;

a second comparator for comparing the current byte stored in said first storage input register with the directly above byte in the same column of the immediately preceding row, which is stored in the Jth stage of said second shift register, to determine if they have the same numerical value, with a second compare signal C2 being provided when they compare, and a second non-compare signal N2 being provided when they don't compare;

a first counter which advances in count each time C1 is generated by said first comparator, with said first counter ceasing to count each time N1 is generated by said first comparator, with a count signal Pn, being generated, with n being an integer which is indicative of the number of successive current bytes read out in sequence which are equal in numerical value to each immediately preceding byte;

a second counter which advances in count each time C2 is generated by said second comparator, with said second counter ceasing to count each time N2 is generated by said second comparator, with a count signal Am being generated, with m being an integer which is indicative of the number of successive current bytes read out in sequence which are equal in numerical value to each directly above byte;

a third comparator for comparing Pn and Am, with a signal b1 being generated when Pn and Am both are equal to zero, with a signal b2 being generated when Am is greater than or equal to Pn, and with a signal b3 being generated when Pn is greater than Am;

a selection means for providing at the output thereof a signal S which is indicative of the numerical value of the current byte stored in said first input shift register in response to the generation of the signal b1, with the signal Am being provided in response to the generation of the signal b2, and with the signal Pn being generated in response to the generation of the signal b3; and means for storing the successively generated signals Pn, Am and S for a given complex character as a compacted complex character representation therof.

8. The combination claimed in claim 7, including:

means for generating on a utilization device said given complex character in response to retrieving said compacted complex character from said means for storing and decoding the signals Pn, Am and comprising said compacted character.

9. A method of compacting a Kanji character, wherein said Kanji character is defined by an I row by J column matrix, wherein each row is comprised of J bytes, where I and J are integers, said method comprising the steps of:

scanning each row successively a byte at a time to determine if the current byte being scanned has the same numerical value as the immediately preceding byte in the scanning sequence, or has the same numerical value as the directly above byte in the same column of the immediately preceding row, or has a numerical value different than the immediately preceding byte or the directly above byte;

encoding the number of successively scanned bytes that have the same numerical value as the immediately preceding byte as a single symbol Pn, where n is an integer which is indicative of the number of successive current bytes scanned in sequence which are equal in numerical value to each immediately preceding byte;

encoding the number of successively scanned bytes that have the same numerical value as the directly above byte as a single symbol Am, where m is an integer which is indicative of the number of successive current bytes scanned in sequence which are equal in numerical value to each immediately preceding byte;

encoding the number of successively scanned bytes as a predetemined one of Pn and Am when n and m are equal; and encoding any current byte, which is not of the same numerical value as the immediately preceding byte or the directly above byte, with a symbol Sx, where x is an integer which is indicative of the numerical value of said current byte.

10. The method of claim 9, including the step of:

storing in binary form the symbols Pn, Am and Sx comprising a given compacted Kanji character.

11. The method of claim 10, including the step of:

generating on a utilization device a given Kanji character in response to retrieving and decoding the binary representations of the symbols Pn, Am and Sx comprising said compacted Kanji character.

12. In apparatus for compacting a Kanji character, wherein said Kanji character is defined by an I row by J column matrix, wherein each row is comprised of J bytes, where I and J are integers, the combination comprising:

means for storing a Kanji character font in a storage device;

means for reading out a given Kanji character in said font a byte at a time from the first through the Jth byte successively from the first through Ith row to determine if the current byte being scanned has the same numerical value as the immediately preceding byte in the read out sequence, or has the same numerical value as the directly above byte in the same column of the immediately preceding row, or has a numerical value different than the immediately preceding byte or the directly above byte;

means for encoding the number of successively read out sequence of bytes that have the same numerical value as the immediately preceding byte as a single symbol Pn, where n is an integer which is indicative of the number of successive current bytes read out in sequence which are equal in numerical value to each immediately preceding byte;

means for encoding the number of successively read out sequence of bytes that have the same numerical value as the directly above byte as a single symbol Am, where m is an integer which is indicative of the number of successive current bytes read out in sequence which are equal in numerical value to each directly above byte;

means for encoding the number of successively read out sequence of bytes as a predetermined one of Pn and Am when n and m are equal;

means for encoding any current byte read out, which is not of the same numerical value as the immediately preceding byte or the directly above byte, with a symbol Sx, where x is an integer which is indicative of the numerical value of said current byte; and means for storing the successively generated symbol Pn, Am and Sx for said given Kanji character as a compacted Kanji character representation of said given Kanji character.

13. The combination claimed in claim 12, including:

means for generating on a utilization device said given Kanji character in response to retrieving said compacted Kanji character from said means for storing and decoding the symbols words Pn, Am and Sx comprising said compacted Kanji character.

14. A method of compacting a complex character wherein said character is defined by an I row by J column matrix, wherein each column is comprised of I bytes, where I and J are integers, and each column position in a row is one byte in length, said method comprising the steps of:

scanning each row a column position at a time from the first through the Ith row to determine if the byte in a column position presently being scanned has the same value as the byte in the previous column position in the scanning sequence or has the same value as the byte in the above column position in the same column and immediately preceding row;

encoding the number of successive bytes that are the same value as the byte in the previous column position as a symbol Pn, where n is an integer which is indicative of the number of bytes scanned in sequence which are equal in value to the byte in the previous column position;

encoding the number of successive bytes that are the same value as the byte in the above column position as a symbol Am, where m is an integer which is indicative of the number of bytes scanned in sequence which are equal in value to the byte in the above column position; and encoding any given byte, which is not of the same value as the byte in the previous column position or the above column position, with a symbol Sx, where x is an integer which is indicative of the numerical value of said any given byte.

15. The method of claim 14, wherein the step of scanning each row a column position at a time comprises scanning each of the eight bit positions comprising a byte in a column position, with eight separate scan elements, scanning in parallel from the first through Ith row.

16. A method of compacting a Kanji character wherein said character is defined by an I row by J column matrix, wherein each column is comprised of I bytes, where I and J are integers, and each column position in a row is one byte in length, said method comprising the steps of:

scanning each row a column position at a time from the first through the Ith row to determine if the byte in a column position presently being scanned has the same value as the byte in the previous column position in the scanning sequence or has the same value as the byte in the above column position in the same column and immediately preceding row;

encoding the number of successive bytes that are the same value as the byte in the previous column position as a symbol Pn, where n is an integer which is indicative of the number of bytes scanned in sequence which are equal in value to the byte in the previous column position;

encoding the number of successive bytes that are the same value as the byte in the above column position as a symbol Am, where m is an integer which is indicative of the number of bytes scanned in sequence which are equal in value to the byte in the above column position; and encoding any given byte, which is not of the same value as the byte in the previous column position or the above column position, with a symbol Sx, where x is an integer which is indicative of the numerical value of said any given byte.

17. The method of claim 16, wherein the step of scanning each row a column position at a time comprises scanning each of the eight bit positions comprising a byte in a column position, with eight separate scan elements, scanning in parallel from the first through Ith row.

* * * * *